(12) United States Patent
Ishizuka et al.

(10) Patent No.: US 7,041,162 B2
(45) Date of Patent: *May 9, 2006

(54) INK COMPOSITION AND INK JET RECORDING METHOD

(75) Inventors: Takahiro Ishizuka, Kanagawa (JP); Kenji Ikeda, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 111 days.

This patent is subject to a terminal disclaimer.

(21) Appl. No.: 10/635,575

(22) Filed: Aug. 7, 2003

(65) Prior Publication Data

US 2004/0035322 A1   Feb. 26, 2004

(30) Foreign Application Priority Data

Aug. 15, 2002  (JP) .............................. 2002-236787

(51) Int. Cl.
*C09D 11/02*   (2006.01)

(52) U.S. Cl. ............................... 106/31.59; 106/31.47; 106/31.48; 106/31.49; 106/31.5; 106/31.51

(58) Field of Classification Search ............. 106/31.59, 106/31.51, 31.48, 31.5, 31.47, 31.49; 347/100
See application file for complete search history.

(56) References Cited

U.S. PATENT DOCUMENTS

| 5,877,235 | A | 3/1999 | Sakuma et al. | |
|---|---|---|---|---|
| 6,025,412 | A | 2/2000 | Sacripante et al. | |
| 6,031,019 | A | 2/2000 | Tsutsumi et al. | |
| 6,521,031 | B1 * | 2/2003 | Kimura et al. | 106/31.47 |
| 6,613,814 | B1 * | 9/2003 | Ishizuka et al. | 523/160 |
| 6,645,281 | B1 * | 11/2003 | Yabuki et al. | 106/31.27 |
| 6,736,887 | B1 | 5/2004 | Tsutsumi et al. | |
| 6,835,240 | B1 * | 12/2004 | Nishita et al. | 106/31.48 |
| 2001/0023267 | A1 * | 9/2001 | Ishizuka et al. | 524/86 |
| 2003/0106462 | A1 * | 6/2003 | Yatake et al. | 106/31.59 |
| 2003/0232902 | A1 * | 12/2003 | Takahashi et al. | 523/160 |
| 2004/0024085 | A1 * | 2/2004 | Ishizuka et al. | 523/160 |
| 2004/0035322 | A1 * | 2/2004 | Ishizuka et al. | 106/31.59 |
| 2004/0106700 | A1 * | 6/2004 | Yamanouchi et al. | 523/160 |
| 2004/0138335 | A1 * | 7/2004 | Ikeda et al. | 523/160 |

FOREIGN PATENT DOCUMENTS

| JP | 06-340835 | 12/1994 |
|---|---|---|
| JP | 07-268260 | 10/1995 |

OTHER PUBLICATIONS

U.S. Appl. No. 10/622,746 filed Jul. 21, 2003 entitled "Ink Composition and Ink-Jet Recording Method".

* cited by examiner

*Primary Examiner*—Helene Klemanski
(74) *Attorney, Agent, or Firm*—Margaret A. Burke; Sheldon J. Moss

(57) ABSTRACT

The present invention provides an aqueous ink composition comprising a color microparticle dispersion including an oil-soluble dye, a hydrophilic organic solvent and a perfluoroalkylenesulfonic acid or a fluorine type surfactant other than derivatives thereof, and an ink jet method for recording an image by using this aqueous ink composition.

21 Claims, No Drawings

INK COMPOSITION AND INK JET RECORDING METHOD

CROSS-REFERENCE TO RELATED APPLICATION

This application claims priority under 35 USC 119 from Japanese Patent Application No. 2002-236787, the disclosure of which is incorporated by reference herein.

BACKGROUND OF THE INVENTION

1. Field of the Invention

The present invention relates to an aqueous ink composition containing a color microparticle dispersion and an ink jet recording method using the ink composition, and, particularly, to an ink composition having excellent printing quality and stability and to an ink jet recording method using the ink composition.

2. Description of the Related Art

With the spread of computers in recent years, ink jet printers are widely used for printing on, for example, paper, films and clothes not only in offices but also in homes. As ink jet recording inks, oil-based ink, aqueous ink and solid ink are known. Among these inks, aqueous ink is advantageous in view of easy production, handling ability, odor, safety, and the like and therefore is in the mainstream.

However, although many of the foregoing inks use a water-soluble dye which dissolves in a molecular state and therefore have the advantages of high transparency and color density, since the dye is water-soluble, these inks have poor water resistance. When these inks are used to print on so-called normal paper, bleeding is caused, leading to a poor print quality and light fastness. Further, these inks have the drawback that in recording paper provided with an ink receiving layer containing a porous inorganic microparticle thereon (hereinafter sometimes referred to as "photographic quality paper"), image preservability is significantly deteriorated by the effects of oxidizing gas (e.g., $SO_x$, $NO_x$ and ozone).

Under such circumstances, aqueous inks using pigments or disperse dyes for the purpose of solving the above problem are proposed in Japanese Patent Application Laid-Open (JP-A) Nos. 56-157468, 4-18468, 10-110126, 10-195355 and the like.

U.S. Pat. No. 6,031,019 discloses an ink including a polymer impregnated with a dye. However, the diameter of an ink particle is relatively large and continuous printing performance using the ink is not sufficient.

However, in the case of these aqueous inks, although water resistance is improved to some extent, there is still a problem in that these inks lack pigment preservation stability and dispersion stability of disperse dye; consequently an ink outlet may be easily clogged. Moreover, there is the problem that in photographic quality paper, the above ink using pigments or dyes has poor permeability, and the aforementioned pigments or dyes are easily peeled off from the surface when rubbed.

On the other hand, methods of encapsulating dyes in urethane or polyester dispersion particles are proposed in JP-A Nos. 58-45272, 6-340835, 7-268254, 7-268257 and 7-268260. However, in the case of ink jet inks obtained according to the above methods, color tone, color reproducibility and color fading stability are insufficient. Further, in the case of printing on photographic quality paper, abrasion-resistant characteristics with respect to, for example, an eraser is insufficient.

U.S. Pat. No. 6,025,412 discloses colored fine particles formed by chemically bonding a dye to a polymer. However, since it is difficult to prepare a monomer having a dye skeleton, the particles cannot widely be used.

As mentioned above, there has not yet been provided an ink composition comprising a color microparticle dispersion which has excellent handling characteristics, acceptable odor and safety characteristics, has sufficiently small particle diameter of dispersion particles, and is superior in dispersion stability and preserving ability of a dispersion, such that there is no clogging at the end of a nozzle, has excellent jetting stability has high color developing ability and excellent color tone (hue) regardless of a type of paper used, has excellent ink permeability even in the case of using the aforementioned photographic quality paper, is also superior in water resistance after printing, and particularly image preserving ability and abrasion resistance after printing and enables high-quality recording at a high density.

SUMMARY OF THE INVENTION

It is an object of the present invention to provide an ink composition having the above-described desirable characteristics.

In this situation, the inventors of the invention have made earnest studies and as a result, found that an aqueous ink composition comprising a color microparticle dispersion containing an oil-soluble dye, a hydrophilic organic solvent and a particular surfactant solves the above problems, and has, particularly, excellent safety, printing performance and stability.

According to a first aspect of the invention, there is provided an aqueous ink composition comprising: a color microparticle dispersion containing; an oil-soluble dye; a hydrophilic organic solvent; and a fluorine type surfactant other than a perfluoroalkylenesulfonic acid or derivatives thereof.

According to a second aspect of the invention, there is provided an ink jet recording method for recording an image by using this aqueous ink composition.

DETAILED DESCRIPTION OF THE INVENTION

An ink composition and an ink jet recording method according to the present invention will be hereinafter described.

Ink Composition

The aqueous ink composition of the invention comprises a color microparticle dispersion containing an oil-soluble dye, a hydrophilic organic solvent and a fluorine type surfactant other than a perfluoroalkylenesulfonic acid or derivatives thereof.

The oil-soluble dye preferably includes at least one component selected from the group consisting of a compound represented by the general formula (I), a compound represented by the general formula (II), a compound represented by the general formula (Y-I), a compound represented by the general formula (M-I) and a compound represented by the general formula (C-I), which will be described later.

The color microparticles of the aqueous ink composition are microparticles of the oil-soluble dye itself, or fine particles containing at least one oil-soluble dye and at least one oil-soluble polymer, and the color microparticles may be prepared by any method, as long as the oil-soluble dye and the oil-soluble polymer are mutually soluble with each other. (oil-soluble dye)

Here, the oil-soluble dye contained in the color microparticle will be explained.

The oil-soluble dye is one of the components forming the color microparticle according to the invention and is a dye which is substantially insoluble in water, and more particularly relates to a dye having a solubility (the mass of the dye which can be dissolved in 100 g of water) in water at 25° C. of 1 g or less, preferably 0.5 g or less and more preferably 0.1 g or less.

The oil-soluble dye is substantially insoluble in water.

As the oil-soluble dye, dyes having a melting point of 200° C. or less are preferable, preferably 150° C. or less, and more preferably 100° C. or less. The use of an oil-soluble dye having a low melting point ensures that the crystalization of the dye in the ink composition is suppressed so that the preservability of the ink composition is improved.

In the ink composition of the invention, the oil-soluble dye may be used either singly or as a mixture of a plurality of dyes. Also, other colorants such as water-soluble dyes, disperse dyes and pigments may be incorporated therein, if necessary, to the extent that the effect of the invention is not impaired.

Examples of the oil-soluble dye which may be used in the ink composition of the invention include anthraquinone type, naphthoquinone type, styryl type, indoaniline type, azo type, nitro type, cumarin type, methine type, porphyrin type, azaporphyrin type and phthalocyanine type dyes. In order to complete the ink composition as an ink jet ink for full-color printing, at least four different color dyes including a black dye in addition to dyes having three primary colors, namely yellow (Y), magenta (M) and cyan (C) are usually necessary.

As the yellow dye among these dyes usable in the invention, any of a variety of yellow dyes may be used. Examples of the yellow dye may include aryl or heterylazo dyes including, for example, phenols, naphthols, anilines, pyrazolones, pyridones or open-chain type active methylene compounds as the coupling component; azomethine dyes containing, for example, open-chain type active methylene compounds as the coupling component; methine dyes such as benzylidene dyes and monomethineoxonol dyes; and quinone type dyes such as naphthoquinone dyes and anthraquinone dyes. Examples of dye types other than these dyes may include quinophthalone dyes, nitro/nitroso dyes, acridine dyes and acridinone dyes.

As the magenta dye among these oil-soluble dyes usable in the present invention, any of a variety of dyes may be selected. Examples of the magenta dyes may include aryl or heterylazo dyes containing, for example, phenols, naphthols or anilines as the coupling component; azomethine dyes containing, for example, pyrazolones or pyrazolotriazoles as the coupling component; methine dyes such as arylidene dyes, styryl dyes, merocyanine dyes and oxonol dyes; carbonium dyes such as diphenylmethane dyes, triphenylmethane dyes and xanthene dyes; quinone type dyes such as naphthoquinone, anthraquinone and anthrapyridone and condensed polycyclic type dyes such as dioxazine dyes.

For the cyan dye among these oil-soluble dyes usable in the invention, any of a variety of dyes may be used. Examples of the cyan dye may include indoaniline dyes, indophenol dyes, azomethine dyes containing pyrrolotriazoles as the coupling component; polymethine dyes such as cyanine dyes, oxonol dyes and merocyanine dyes; carbonium dyes such as diphenylmethane dyes, triphenylmethane dyes and xanthene dyes; phthalocyanine dyes; anthraquinone dyes; aryl or heterylazo dyes containing, for example, phenols, naphthols or anilines as the coupling component; and indigo/thioindigo dyes.

Each of the aforementioned dyes may be one exhibiting each color including yellow, magenta and cyan only when a part of the chromophore is dissociated. The counter cation in this case may be an inorganic cation such as an alkali metal or ammonium, an organic cation such as pyridinium or a quaternary ammonium salt or also a polymer cation having these cations as its partial structure.

Preferable and specific examples of the above oil-soluble dye include the following dyes. However, the invention is not limited to these dyes.

For example, C.I. Solvent Black 3, 7, 27, 29 and 34; C.I. Solvent Yellow 14, 16, 19, 29, 30, 56, 82, 93 and 162; C.I. Solvent Red 1, 3, 8, 18, 24, 27, 43, 49, 51, 72, 73, 109, 122, 132 and 218; C.I. Solvent Violet 3; C.I. Solvent Blue 2, 11, 25, 35, 38, 67 and 70; C.I. Solvent Green 3 and 7; and C.I. Solvent Orange 2 and the like are desirable.

Among these dyes, Nubian Black PC-0850, Oil Black HBB, Oil Yellow 129, Oil Yellow 105, Oil Pink 312, Oil Red 5B, Oil Scarlet 308, Vali Fast Blue 2606, Oil Blue BOS (manufactured by Orient Chemical Industries, Ltd.), Aizen Spilon Blue GNH (manufactured by Hodogaya Chemical Co., Ltd.) and Neopen Yellow 075, Neopen Mazenta SE1378, Neopen Blue 808, Neopen Blue FF4012 and Neopen Cyan FF4238 (manufactured by BASF Ltd.) are more preferable.

Also, in the invention, a disperse dye may be used to the extent that the dye is dissolved in an organic solvent immiscible with water. Preferable examples of the disperse dye include, though not particularly limited to, the following dyes:

For example, C.I. Disperse Yellow 5, 42, 54, 64, 79, 82, 83, 93, 99, 100, 119, 122, 124, 126, 160, 184:1, 186, 198, 199, 201, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C.I. Disperse Green 6:1 and 9 are preferable.

Also, among the aforementioned oil-soluble dyes, compounds represented by the following general formula (I) (azo dyes) and compounds represented by the following general formula (II) (azomethine dyes) are given as preferable examples. The azomethine dyes represented by the following general formula (II) are known as dyes produced from an oxidation product of a developing agent and a coupler in a photographic material.

The compounds represented by the general formulae (I) and (II) will be explained below, wherein compounds in which at least one group of the groups represented by the following general formulae (I) and (II) is in the preferable range shown below are preferable, compounds in which more groups are in the preferable range are more preferable and compounds in which all groups are in the preferable range are particularly preferable.

General formula (I)

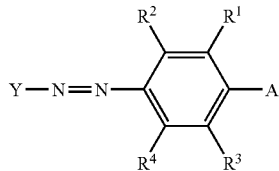

General formula (II)

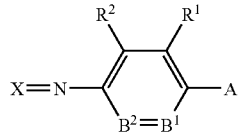

In the above general formulae (I) and (II), $R^1$, $R^2$, $R^3$ and $R^4$ each independently represents a hydrogen atom, a halogen atom, an aliphatic group, an aromatic group, a heterocyclic group, a cyano group, a hydroxy group, a nitro group, an amino group, an alkylamino group, an alkoxy group, an aryloxy group, an amido group, an arylamino group, a ureide group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a sulfinyl group, a phosphoryl group, an acyl group, a carboxyl group or a sulfo group.

As $R^2$ among these groups, a hydrogen atom, halogen atom, aliphatic group, alkoxy group, aryloxy group, amido group, ureido group, sulfamoylamino group, alkoxycarbonylamino group and sulfonamido group are desirable.

In the general formulae (I) and (II), A represents —$NR^5R^6$ or a hydroxy group. —$NR^5R^6$ is preferable as A.

The above $R^5$ and $R^6$ each independently represents a hydrogen atom, an aliphatic group, an aromatic group or a heterocyclic group. As $R^5$ and $R^6$ among these groups, a hydrogen atom, alkyl group, substituted alkyl group, aryl group and substituted aryl group are more preferable and a hydrogen atom, alkyl group having 1 to 18 carbon atoms and substituted alkyl group having 1 to 18 carbon atoms are most preferable. $R^5$ and $R^6$ may be bonded with each other to form a ring.

In the above general formula (II), $B^1$ represents =$C(R^3)$— or =N—. $B^2$ represents —$C(R^4)$= or —N=. The case where $B^1$ and $B^2$ are not —N= at the same time is preferable and the case where $B^1$ is =$C(R^3)$— and $B^2$ is —$C(R^4)$= is more preferable.

In the above general formulae (I) and (II), $R^1$ and $R^5$, and $R^3$ and $R^6$ and/or $R^1$ and $R^2$ may be bonded with each other to form an aromatic ring or a hetero ring.

In this specification, the aliphatic group means an alkyl group, substituted alkyl group, alkenyl group, substituted alkenyl group, alkinyl group, substituted alkinyl group, aralkyl group and substituted aralkyl group.

The above aliphatic group may be branched or cyclic. The number of carbon atoms in the above aliphatic group is preferably 1 to 20 and more preferably 1 to 18.

The aryl part of the above aralkyl group or substituted aralkyl group is preferably a phenyl group or a naphthyl group and is more preferably a phenyl group.

As the substituent of the alkyl moiety in the aforementioned substituted alkyl group, substituted alkenyl group, substituted alkinyl group and substituted aralkyl group, the same groups as the examples of the substituent given as the above $R^1$, $R^2$, $R^3$ and $R^4$ are exemplified.

As the substituent of the aryl moiety in the above substituted aralkyl group, the same groups as the examples of the substituent in the following substituted aryl group are exemplified.

In this specification, the aromatic group means an aryl group and a substituted aryl group. As the aryl group, a phenyl group and a naphthyl group are preferable and a phenyl group is more preferable.

The aryl moiety of the above substituted aryl group is the same as in the case of the above aryl group.

As the substituent in the above substituted aryl group, the same groups as the examples of the substituent given in the above $R^1$, $R^2$, $R^3$ and $R^4$ are exemplified.

In the general formula (I), Y represents an unsaturated heterocyclic group. As Y, a five-membered or six-membered unsaturated hetero ring is preferable. An aliphatic ring, an aromatic ring or other hetero ring may be condensed with the hetero ring. Examples of the heteroatom of the hetero ring include N, O and S.

As the above unsaturated hetero ring, for example, a pyrazole ring, imidazole ring, thiazole ring, isothiazole ring, thiadiazole ring, thiophene ring, benzothiazole ring, benzoxazole ring, benzoisothiazole ring, pyrimidine ring, pyridine ring and quinoline ring are preferable. Also, the above unsaturated heterocyclic group may have a substituent as those exemplified in the case of the aforementioned $R^1$ to $R^4$.

In the general formula (II), X represents a residue of a photographic color coupler. As the coupler, the following couplers are desirable.

Examples of a yellow dye forming coupler (hereinafter referred to as a yellow coupler) include couplers represented by the general formulae (I) and (II) described in U.S. Pat. Nos. 3,933,501, 4,022,620, 4,326,024, 4,401,752 and 4,248,961, JP-B No. 58-10739, U.K. Patent Nos. 1,425,020 and 1,476,760, U.S. Pat. Nos. 3,973,968, 4,314,023 and 4,511,649, EP Nos. 249,473A and 502,424A, couplers represented by the general formulae (1) and (2) (particularly Y-28 on page 18) in EP No. 513,496A, couplers represented by the general formula (I) in claim 1 of EP No. 568, 037A, couplers represented by the general formula (I) in U.S. Pat. No. 5,066,576, Column 1, line 45 to line 55, couplers represented by the general formula (I) in JP-A No. 4-274425, Paragraph No. 0008, couplers described in claim 1 (particularly D-35 on page 18) of EP No. 498,381A1, page 40, couplers represented by the general formula (Y) (particularly Y-1 (page 17) and Y-54 (page 41)) in EP No. 447, 969A1, page 4, and couplers represented by the general formulae (II) to (IV) (particularly II-17 and 19 (Column 17) and II-24 (Column 19)) in U.S. Pat. No. 4,476,219, Column 7, line 36 to line 58, the disclosures of which are incorporated herein by reference.

Examples of a magenta dye forming coupler (hereinafter referred to as a magenta coupler) include couplers described in U.S. Pat. Nos. 4,310,619 and 4,351,897, EP No. 73,636, U.S. Pat. Nos. 3,061,432 and 3,725,067, Research Disclosure Nos. 24220 (June, 1984) and 24230 (June, 1984), JP-A Nos. 60-33552, 60-43659, 61-72238, 60-35730, 55-118034 and 60-185951, U.S. Pat. Nos. 4,500,630, 4,540,654 and 4,556,630, International Patent Application Laid-Open WO88/04795, JP-A No. 3-39737 (L-57 (page 11, right lower column), L-68 (page 12, right lower column) and L-77 (page 13, right lower column), EP Nos. 456,257 ([A-4]-63 (page 134), [A-4]-73, -75 (page 139), 486,965 (M-4, -6 (page 26), M-7 (page 27)) and 571,959A (M-45 (page 19)) and JP-A Nos. 5-204106 ((M-1) (page 6)) and 4-362631, (M-22, Paragraph No. 0237), the disclosures of which are incorporated herein by reference.

Examples of a cyan dye coupler (hereinafter referred to as a cyan coupler) include couplers described in U.S. Pat. Nos. 4,052,212, 4,146,396, 4,228,233 and 4,296,200, EP No. 73,636, JP-A No. 4-204843 (CX-1, 3, 4, 5, 11, 12, 14 and 15 (page 14 to page 16)); JP-A No. 4-43345 (C-7, 10 (page 35), 34, 35 (page 37), (I-1), (I-17) (page 42 to page 43)); and JP-A No. 6-67385 (couplers represented by the general formula (Ia) or (Ib) in claim 1), the disclosures of which are incorporated herein by reference.

Further, couplers described in JP-A Nos. 62-215272 (page 91) and 2-33144 (page 3 and page 30) and EP No. 355,660A (pages 4, 5, 45 and 47), the disclosures of which which are incorporated herein by reference are also useful.

As the magenta dye among the dyes represented by the general formula (I), dyes represented by the following general formula (III) are particularly preferable.

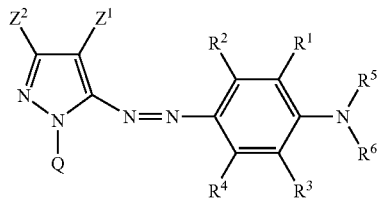

General formula (III)

In the general formula (III), $Z^1$ represents an electron attractive group having a Hammett's substituent constant $\sigma_p$ value of 0.20 or more. As $Z^1$, an electron attractive group having a Hammett's substituent constant $\sigma_p$ value of 0.30 or more and 1.0 or less is preferable. Preferable and specific examples of the substituent may include electron attractive substituents as will be described later. Among these substituents, an acyl group having 2 to 12 carbon atoms, alkyloxycarbonyl group having 2 to 12 carbon atoms, nitro group, cyano group, alkylsulfonyl group having 1 to 12 carbon atoms, arylsulfonyl group having 6 to 18 carbon atoms, carbamoyl group having 1 to 12 carbon atoms and halogenated alkyl group having 1 to 12 carbon atoms are more preferable, a cyano group, alkylsulfonyl group having 1 to 12 carbon atoms and arylsulfonyl group having 6 to 18 carbon atoms are still more preferable and a cyano group is particularly preferable.

$R^1$ to $R^6$ have the same meanings as those described in the aforementioned general formula (I).

$Z^2$ represents a hydrogen atom, an aliphatic group or an aromatic group.

Q represents a hydrogen atom, an aliphatic group, an aromatic group or a heterocyclic group. Among these groups, groups composed of a nonmetal atomic group necessary to form a five- to eight-membered ring are preferable and aromatic groups or heterocyclic groups are more preferable as Q. The five- to eight-membered ring may be substituted, may be a saturated ring and may have an unsaturated bond. As the above nonmetal atomic group, a nitrogen atom, oxygen atom, sulfur atom or carbon atom is preferable.

Preferable examples of the five- to eight-membered ring include a benzene ring, cyclopentane ring, cyclohexane ring, cycloheptane ring, cyclooctane ring, cyclohexene ring, pyridine ring, pyrimidine ring, pyrazine ring, pyridazine ring, triazine ring, imidazole ring, benzoimidazole ring, oxazole ring, benzoxazole ring, oxane ring, sulfolane ring and thian ring. When these rings further have substituents, the groups exemplified in the case of the aforementioned $R^1$ to $R^4$ are preferable as the substituents.

Preferable structures of the dye represented by the general formula (III) are described in Japanese Patent Application Laid-Open (JP-A) No. 2001-335714, the disclosure of which is incorporated herein by reference.

As the magenta dye among the dyes represented by the general formula (II), dyes represented by the following general formula (IV) are particularly preferable.

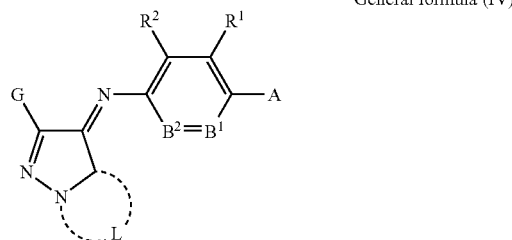

General formula (IV)

In the general formula (IV), G represents a hydrogen atom, an aliphatic group, an aromatic group, a heterocyclic group, a cyano group, an alkoxy group, an aryloxy group, an alkylthio group, an arylthio group, an ester group, an amino group, a carbamoyl group, a sulfonyl group, a sulfamoyl group, a ureide group, a urethane group, an acyl group, an amido group or a sulfonamido group.

Also, $R^1$, $R^2$, A, $B^1$ and $B^2$ have the same meanings as those described in the general formula (II). Preferable ranges of these groups are the same as in the case of the general formula (II).

L represents an atomic group forming a five- or six-membered hetero ring containing nitrogen. The atomic group forming a nitrogen-containing hetero ring may be substituted with at least one of an aliphatic group, aromatic group, heterocyclic group, cyano group, alkoxy group, aryl group, oxy group, alkylthio group, arylthio group, ester group, amino group, carbamoyl group, sulfonyl group, sulfamoyl group, ureide group, urethane group, acyl group, amido group and sulfonamido group and may further form a condensed ring in combination with other rings.

In the dye represented by the general formula (IV), $-NR^5R^6$ is preferable as A and L preferably forms a five-membered heterocyclic ring containing nitrogen. As the five-membered heterocycle containing nitrogen, for example, an imidazole ring, triazole ring and tetrazole ring are preferable.

Next, compounds exemplified as the magenta dye among the dyes represented by the general formulae (I) and (II) are described in Japanese Patent Application Laid-Open (JP-A) No. 2003-73598, Paragraph Nos. [0068] to [0085]. The invention is not limited by these compounds at all. Also, examples of the compound usable in the invention include, other than the aforementioned exemplified compounds, though not limited to, those described in Japanese Patent Application Nos. 11-365187, JP-A Nos. 2001-181549 and 2001-335714, the disclosures of which are incorporated herein by reference.

The dyes represented by the general formula (III) in the invention may be synthesized with reference to, for example, the methods described in JP-A Nos. 2001-335714 and 55-161856, the disclosures of which are incorporated by reference.

The dyes represented by the general formula (IV) in the invention may be synthesized with reference to, for example, the methods described in JP-A No. 4-126772, JP-B No. 7-94180 and JP-A No. 2001-240763, the disclosures of which are incorporated by reference.

As the cyan dye among the dyes represented by the general formula (II), pyrrolotriazoleazomethine dyes represented by the general formula (V) are particularly preferable.

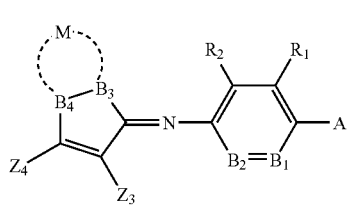

General formula (V)

In the general formula (V), A, $R^1$, $R^2$, $B^1$ and $B^2$ have the same meanings as those described in the general formula (II) and their preferable ranges are the same as those described in the general formula (II).

$Z^3$ and $Z^4$ respectively have the same meaning as G in the general formula (IV). $Z^3$ and $Z^4$ may be combined with each other to form a cyclic structure.

M is an atomic group forming a 1,2,4-triazole ring condensed with the five-membered ring of the general formula (V), wherein either one of two atoms $B^3$ and $B^4$ in the condensed part is a nitrogen atom and the other is a carbon atom.

Among pyrrolotriazoleazomethine dyes represented by the general formula (V), those with $Z^3$ being an electron attractive group having a Hammett's substituent constant $\sigma_p$ value of 0.30 or more are more preferable because sharp absorption is obtained, those with $Z^3$ being an electron attractive group having a Hammett's substituent constant $\sigma_p$ value of 0.45 or more are still more preferable and those with $Z^3$ being an electron attractive group having a Hammett's substituent constant $\sigma_p$ value of 0.60 or more are particularly preferable.

In addition, those in which the sum of each Hammett's substituent constant value $\sigma_p$ value of $Z^3$ and $Z^4$ is 0.70 or more exhibit an excellent hue as a cyan color and is therefore most preferable.

The pyrrolotriazoleazomethine dye represented by the general formula (V) represented by the general formula (V) may be used as a magenta dye by changing the substituent but is preferably used as a cyan dye.

Here, the Hammett's substituent constant $\sigma_p$ value used in this specification will be explained.

The Hammett's rule is a rule of thumb proposed by L. P. Hammett in 1935 to discuss the effect of a substituent on the reaction or equilibrium of a benzene derivative quantitatively. The validity of this rule is widely admitted at present.

The substituent constant found by the Hammett's rule includes an $\sigma_p$ value and an $\sigma_m$ value and these values are found in general reference materials, for example, in J. A. Dean edition "Lange's Handbook of Chemistry" 12th edition, 1979 (McGraw-Hill) and "Area of Chemistry" Special Number, No. 122, pp. 96–103, 1979 (Nanko-Do), the disclosures of which are incorporated by reference, in which these values are described in detail.

In the invention, each substituent is limited or explained using the Hammett's substituent constant $\sigma_p$ value. It is needless to say that this does not imply a limitation to only substituents for which the value concerned is found in the reference of the above fair book, but involves substituents whose values will be embraced in its range when the values are measured based on the Hammett's rule even if the value is unknown in document.

Also, though compounds which are not benzene derivatives are included in the compounds represented by the general formulae (I) to (V) in the invention, the $\sigma_p$ value is used as a measure showing the electron effect of a substituent irrespective of the position of substitution. Therefore, in the invention, the $\sigma_p$ value is used in this meaning.

Examples of an electron attractive group having a Hammett's substituent constant $\sigma_p$ value of 0.60 or more include a cyano group, nitro group and alkylsulfonyl group (e.g., a methanesulfonyl group and arylsulfonyl group (e.g., a benzenesulfonyl group)).

Examples of an electron attractive group having a Hammett's substituent constant $\sigma_p$ value of 0.45 or more include, besides the above groups, an acyl group (e.g., an acetyl group), alkoxycarbonyl group (e.g., a dodecyloxycarbonyl group), aryloxycarbonyl group (e.g., a m-chlorophenoxycarbonyl), alkylsulfinyl group (e.g., n-propylsulfinyl), arylsulfinyl group (e.g., phenylsulfinyl), sulfamoyl group (e.g., N-ethylsulfamoyl and N,N-dimethylsulfamoyl) and alkyl halide group (e.g., trifluoromethyl).

Examples of an electron attractive group having a Hammett's substituent constant $\sigma_p$ value of 0.30 or more include, besides the above groups, an acyloxy group (e.g., acetoxy), carbamoyl group (e.g., N-ethylcarbamoyl and N.N-dibutylcarbamoyl), alkoxy halide group (e.g., trifluoromethyloxy), aryloxy halide (e.g., pentachlorophenyloxy), sulfonyloxy group (e.g., a methylsulfonyloxy group), alkylthio halide group (e.g., difluoromethylthio), aryl group substituted with two or more electron attractive groups having an $\sigma_p$ value of 0.15 or more (e.g., 2,4-dinitrophenyl and pentachlorophenyl) and hetero ring (e.g., 2-benzoxazolyl, 2-benzothiazolyl and 1-phenyl-2-benzimidazolyl).

Examples of an electron attractive group having a Hammett's substituent constant $\sigma_p$ value of 0.20 or more include, besides the above groups, a halogen atom.

The exemplified compounds (C-1 to C-9) of a cyan dye among the pyrrolotriazoleazomethine dye in the invention are shown in Paragraph Nos. [0100] to [0102] of Japanese Patent Application Laid-Open (JP-A) No. 2003-73598 the disclosures of which are incorporated herein by reference, however, the invention is not limited by these compounds at all.

Examples of the dye usable in the invention include exemplified compounds described in Japanese Patent Application No. 11-365188 incorporated herein by reference. The invention is not limited by these compounds at all.

As a yellow dye used as the oil-soluble dye in the invention, compounds (dyes) represented by the following general formula (Y-I) are preferable.

   General formula (Y-I)

In the general formula (Y-I), A and B respectively represent a heterocyclic group which may be substituted. The hetero ring is preferably hetero rings constituted of a five- or six-membered ring, may be either a monocyclic structure or a polycyclic structure obtained by the condensation of two or more rings and may be an aromatic hetero ring or non-aromatic hetero ring. The hetero atom constituting the above hetero ring is preferably a nitrogen tom, oxygen atom or sulfur atom.

As the hetero ring represented by A in the general formula (Y-I), 5-pyrazolone, pyrazole, oxazolone, isoxazolone, barbituric acid, pyridone, rhodanine, pyrazolidinedion, pyrazolopyridone, meldramic acid and condensed hetero rings obtained from these hetero rings by ring condensation with a hydrocarbon aromatic ring or a hetero ring are preferable. Among these hetero rings, 5-pyrazolone, 5-aminopyrazole, pyridone and pyrazoloazoles are preferable and 5-aminopyrazole, 2-hydroxy-6-pyridone and pyrazolotriazole are particularly preferable.

In the above general formula (Y-I), preferable examples of the hetero ring represented by B include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzoimidazole, triazole, oxazole, isooxazole, benzoxazole, thiazole, benzothiazole, isothiazole, benzoisothiazole, thiadiazole, benzoisooxazole, pyrrolidine, piperidine, piperazine, imidazolidine and thiazoline. Among these hetero rings, pyridine, quinoline, thiophene, benzothiophene, pyrazole, imidazole, benzoimidazole, triazole, oxazole, isooxazole, benzoxazole, thiazole, benzothiazole, isothiazole, benzoisothiazole, thiadiazole and benzoisooxazole are preferable, quinoline, thiophene, pyrazole, thiazole, benzoxazole, benzoisooxazole, isothiazole, imidazole, benzothiazole and thiadiazole are still more preferable and pyrazole, benzothiazole, benzoxazole, imidazole, 1,2,4-thiadiazole and 1,3,4-thiadiazole are particularly preferable.

Examples of the substituent with which the aforementioned A and B are substituted include a halogen atom, alkyl group, cycloalkyl group, aralkyl group, alkenyl group, alkinyl group, aryl group, hetrocyclic group, cyano group, hydroxyl group, nitro group, alkoxy group, aryloxy group, silyloxy group, heterocyclic oxy group, acyloxy group, carbamoyloxy group, alkoxycarbonyloxy group, aryloxycarbonyloxy group, amino group, acylamino group, aminocarbonylamino group, alkoxycarbonylamino group, aryloxycarbonylamino group, sulfamoylamino group, alkyl or arylsulfonylamino group, mercapto group, alkylthio group, arylthio group, heterocyclic thio group, sulfamoyl group, alkyl or arylsulfinyl group, alkyl or arylsulfonyl group, acyl group, aryloxycarbonyl group, alkoxycarbonyl group, carbamoyl group, imide group, phosphino group, phosphinyl group, phosphinyloxy group, phosphinylamino group and silyl group.

Among the dyes represented by the general formula (Y-I), dyes represented by the following general formulae (Y-II) (Y-III) and (Y-IV) are more preferable.

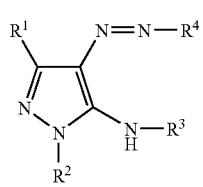

General formula (Y-II)

In the general formula (Y-II), $R^1$ and $R^3$ respectively represent a hydrogen atom, a cyano group, an alkyl group, a cycloalkyl group, an aralkyl group, an alkoxy group, an alkylthio group, an arylthio group, an aryl group or an ionic hydrophilic group. $R^2$ represents a hydrogen atom, an alkyl group, a cycloalkyl group, an aralkyl group, a carbamoyl group, an acyl group, aryl group or a heterocyclic group. $R^4$ represents a heterocyclic group.

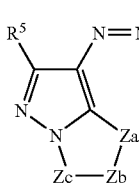

General formula (Y-III)

In the general formula (Y-III), $R^5$ represents a hydrogen atom, a cyano group, an alkyl group, a cycloalkyl group, an aralkyl group, an alkoxy group, an alkylthio group, an arylthio group, an aryl group or an ionic hydrophilic group. Za represents —N═, —NH— or $C(R^{11})$═, and Zb and Zc each independently represents —N═ or $C(R^{11})$═, wherein $R^{11}$ represents a hydrogen atom or a nonmetal substituent. $R^6$ represents a heterocyclic group.

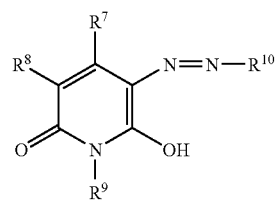

General formula (Y-IV)

In the general formula (Y-IV), $R^7$ and $R^9$ each independently represents a hydrogen atom, a cyano group, an alkyl group, a cycloalkyl group, an aralkyl group, an aryl group, an alkylthio group, an arylthio group, an alkoxycarbonyl group, a carbamoyl group or an ionic hydrophilic group. $R^8$ represents a hydrogen atom, a halogen atom, an alkyl group, an alkoxy group, an aryl group, an aryloxy group, a cyano group, an acylamino group, a sulfonylamino group, an alkoxycarbonylamino group, a ureide group, an alkylthio group, an arylthio group, an alkoxycarbonyl group, a carbamoyl group, a sulfamoyl group, a sulfonyl group, an acyl group, an alkylamino group, an arylamino group, a hydroxy group or an ionic hydrophilic group. $R^{10}$ represents a heterocyclic group.

The substituents represented by $R^1$, $R^2$, $R^3$, $R^5$, $R^7$, $R^8$ and $R^9$ in the general formulae (Y-II), (Y-III) and (Y-IV) will be explained in detail below.

The alkyl group represented by $R^1$, $R^2$, $R^3$, $R^5$, $R^7$, $R^8$ or $R^9$ includes alkyl groups having a substituent and unsubstituted alkyl groups.

The alkyl group is preferably an alkyl group having 1 to 20 carbon atoms. Examples of the substituent include a hydroxyl group, alkoxy group, cyano group, halogen atom and ionic hydrophilic group.

Preferable examples of the alkyl group include methyl, ethyl, butyl, isopropyl, t-butyl, hydroxyethyl, methoxyethyl, cyanoethyl, trifluoromethyl, 3-sulfopropyl and 4-sulfobutyl.

The cycloalkyl group represented by $R^1$, $R^2$, $R^3$, $R^5$, $R^7$, $R^8$ or $R^9$ includes cycloalkyl groups having a substituent and unsubstituted cycloalkyl groups.

The cycloalkyl group is preferably a cycloalkyl group having 5 to 12 carbon atoms. Examples of the substituent include an ionic hydrophilic group.

Examples of the cycloalkyl group include cyclohexyl.

The aralkyl group represented by $R^1$, $R^2$, $R^3$, $R^5$, $R^7$, $R^8$ or $R^9$ includes aralkyl groups having a substituent and unsubstituted aralkyl groups.

The aralkyl group is preferably an aralkyl group having 7 to 20 carbon atoms. Examples of the substituent include an ionic hydrophilic group.

Preferable examples of the aralkyl group include benzyl and 2-phenethyl.

The aryl group represented by $R^1$, $R^2$, $R^3$, $R^5$, $R^7$ or $R^9$ includes aryl groups having a substituent and unsubstituted aryl groups.

The aryl group is preferably an aryl group having 6 to 20 carbon atoms. Examples of the substituent include an alkyl group, alkoxy group, halogen atom, alkylamino group and ionic hydrophilic group.

Preferable examples of the aryl group include phenyl, p-tolyl, p-methoxyphenyl, o-chlorophenyl and m-(3-sulfopropylamino)phenyl.

The alkylthio group represented by $R^1$, $R^2$, $R^3$, $R^5$, $R^7$, $R^8$ or $R^9$ includes alkylthio groups having a substituent and unsubstituted alkylthio groups.

The alkylthio group is preferably an alkylthio group having 1 to 20 carbon atoms. Examples of the substituent include an ionic hydrophilic group.

Preferable examples of the alkylthio group include methylthio group and ethylthio.

The arylthio group represented by $R^1$, $R^2$, $R^3$, $R^5$, $R^7$, $R^8$ or $R^9$ includes arylthio groups having a substituent and unsubstituted arylthio groups.

The arylthio group is preferably an arylthio group having 6 to 20 carbon atoms. Examples of the substituent include an alkyl group and ionic hydrophilic group.

Preferable examples of the arylthio group include phenylthio and p-tolylthio.

The heterocyclic group represented by $R^2$ is preferably five-membered or six-membered hetero rings, which may be further ring-condensed. The hetero atom constituting the hetero ring is preferably a nitrogen atom, sulfur atom or oxygen atom. Also, the hetero ring may be an aromatic hetero ring or non-aromatic hetero ring. The hetero ring may be further substituted. Preferable examples of the substituent include the same substituents as those for the aryl group as will be explained later. Preferable examples of the hetero ring include six-membered aromatic hetero rings containing nitrogen. Among these hetero rings, triazine, pyrimidine and phthalazine are particularly preferable.

Preferable examples of the halogen atom represented by $R^8$ include a fluorine atom, chlorine atom and bromine atom.

The alkoxy group represented by $R^1$, $R^3$, $R^5$ and $R^8$ include alkoxy groups having a substituent and unsubstituted alkoxy groups.

The alkoxy group is preferably an alkoxy group having 1 to 20 carbon atoms. Examples of the substituent include a hydroxyl group and ionic hydrophilic group.

Preferable examples of the alkoxy group include methoxy, ethoxy, isopropoxy, methoxyethoxy, hydroxyethoxy and 3-carboxypropoxy.

The aryloxy group represented by $R^8$ include aryloxy groups having a substituent and unsubstituted aryloxy groups.

The aryloxy group is preferably an aryloxy group having 6 to 20 carbon atoms. Examples of the substituent include an alkoxy group and ionic hydrophilic group.

Preferable examples of the aryloxy group include phenoxy, p-methoxyphenoxy and o-methoxyphenoxy.

The acylamino group represented by $R^8$ include acylamino groups having a substituent and unsubstituted acylamino groups.

The acylamino group is preferably an acylamino group having 2 to 20 carbon atoms. Examples of the substituent include an ionic hydrophilic group.

Preferable examples of the acylamino group include acetamide, propionamide, benzamide and 3,5-disulfobenzamide.

The sulfonylamino group represented by $R^8$ include sulfonylamino groups having a substituent and unsubstituted sulfonylamino groups.

The sulfonylamino group is preferably a sulfonylamino group having 1 to 20 carbon atoms.

Preferable examples of the sulfonylamino group include methylsulfonylamino and ethylsulfonylamino.

The alkoxycarbonylamino group represented by $R^8$ include alkoxycarbonylamino groups having a substituent and unsubstituted alkoxycarbonylamino groups.

The alkoxycarbonylamino group is preferably an alkoxycarbonylamino group having 2 to 20 carbon atoms. Examples of the substituent include an ionic hydrophilic group.

Preferable examples of the alkoxycarbonylamino group include ethoxycarbonylamino.

The ureide group represented by $R^8$ include ureide groups having a substituent and unsubstituted ureide groups.

The ureide group is preferably a ureide group having 1 to 20 carbon atoms.

Examples of the substituent include an alkyl group and aryl group.

Preferable examples of the ureide group include 3-methylureide, 3,3-dimethylureide and 3-phenylureide.

The alkoxycarbonyl group represented by $R^7$, $R^8$ and $R^9$ include alkoxycarbonyl groups having a substituent and unsubstituted alkoxycarbonyl groups.

The alkoxycarbonyl group is preferably an alkoxycarbonyl group having 2 to 20 carbon atoms. Examples of the substituent include an ionic hydrophilic group.

Preferable examples of the alkoxycarbonyl group include methoxycarbonyl and ethoxycarbonyl.

The carbamoyl group represented by $R^2$, $R^7$, R and $R^9$ include carbamoyl groups having a substituent and unsubstituted carbamoyl groups. Examples of the substituent include an alkyl group.

Preferable examples of the carbamoyl group include a methylcarbamoyl group and dimethylcarbamoyl group.

The sulfamoyl group represented by $R^8$ include sulfamoyl groups having a substituent and unsubstituted sulfamoyl groups. Examples of the substituent include an alkyl group.

Preferable examples of the sulfamoyl group include a dimethylsulfamoyl group and di-(2-hydroxyethyl)sulfamoyl group.

Preferable examples of the sulfonyl group represented by $R^8$ include methanesulfonyl and phenylsulfonyl.

The acyl group represented by $R^2$ and $R^8$ include acyl groups having a substituent and unsubstituted acyl groups. The acyl group is preferably an acyl group having 1 to 20 carbon atoms. Examples of the substituent include an ionic hydrophilic group.

Preferable examples of the acyl group include acetyl and benzoyl.

The amino group represented by $R^8$ include amino groups having a substituent and unsubstituted amino groups. Examples of the substituent include an alkyl group, aryl group and a heterocyclic group.

Preferable examples of the amino group include methylamino, diethylamino, anilino and 2-chloroanilino.

The heterocyclic groups represented by the general formulae $R^4$, $R^6$ and $R^{10}$ are the same as those which are represented by B in the general formula (Y-I) and may be substituted. Preferable examples, more preferable examples and particularly preferable examples are also the same as above.

Examples of the substituent include an ionic hydrophilic group, alkyl group having 1 to 12 carbon atoms, aryl group, alkyl or arylthio group, halogen atom, cyano group, sulfamoyl group, sulfonamino group, carbamoyl group and acylamino group, wherein the alkyl group, aryl group and the like may further have a substituent.

In the above general formula (Y-III), Za represents —N=, —NH— or $C(R^{11})$=. Zb and Zc respectively represent —N= or $C(R^{11})$=. $R^{11}$ represents a hydrogen atom or a nonmetal substituent. As the nonmetal substituent represented by $R^{11}$, a cyano group, cycloalkyl group, aralkyl group, aryl group, alkylthio group, arylthio group or ionic hydrophilic group is preferable. Each of the aforementioned substituents is the same as each of the substituents represented by $R^1$. Preferable examples are also the same. Examples of the skeleton of the hetero ring consisting of two five-membered rings included in the general formula (Y-III) will be shown below.

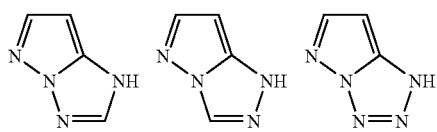

When each substituent explained above may further have a substituent, examples of the substituent may include those with which the hetero rings A and B in the general formula (Y-I) may be substituted.

Specific examples (Y-101 to Y-155) of the dye represented by the general formula (Y-I) are shown in Paragraph Nos. [0139] to [0149] of JP-A No. 2003-73598, the disclosures of which are incorporated by reference. The dye to be used in the invention is not limited to the following specific examples. These compounds maybe synthesized with reference to each publication of JP-A Nos. 2-24191 and 2001-279145, the disclosures of which are incorporated by reference.

Further, as oil-soluble dyes preferably used as the oil-soluble dye of the invention, compounds (hereinafter referred to as "azo dye" as the case may be) represented by the following general formula (M-I) are preferable. These compounds represented by the general formula (M-I) in the invention will be explained.

General formula (M-I)

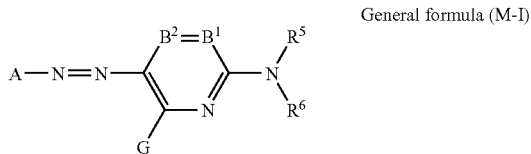

In the general formula (M-I), A represents substituent including a five-membered hetero ring.

As to $B^1$ and $B^2$, $B^1$ represents $=CR^1-$ and $B^2$ represents $-CR^2=$ or either one of them represents a nitrogen atom and the other represents $=CR^1-$ or $-CR^2=$.

$R^5$ and $R^6$ respectively represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group. Each group may further have a substituent.

G, $R^1$ and $R^2$ respectively represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted with an alkyl group, an aryl group or a heterocyclic group, an acylamino group, a ureide group, a sulfamoylamino group, an alkoxycarbonylamino group, an aryloxycarbonylamino group, an alkylarylsulfonylamino group, an arylsulfonylamino group, an aryloxycarbonylamino group, a nitro group, an alkylthio group, an arylthio group, an alkylsulfonyl group, an arylsulfonyl group, an alkylsulfinyl group, an arylsulfinyl group, a sulfamoyl group, a sulfo group or heterocyclic thio group. Each group may be further substituted.

Also, $R^1$ and $R^5$ or $R^5$ and $R^6$ may be combined with each other to form a five- or six-membered ring.

The compounds represented by the general formula (M-I) in the invention will be explained in detail.

In the general formula (M-I), A represents a substituent containing a five-membered hetero ring. Examples of the hetero atom of the five-membered hetero ring may include N, O and S. A nitrogen containing a five-membered hetero ring is preferable and the hetero ring may be condensed with an aliphatic ring, aromatic ring or other hetero rings.

Preferable examples of the hetero ring of A may include a pyrazole ring, imidazole ring, thiazole ring, isothiazole ring, thiadiazole ring, benzothiazole ring, benzoxazole ring and benzoisothiazole ring. Each heterocyclic group may have a substituent. Among these hetero rings, pyrazole rings, imidazole rings, isothiazole rings, thiadiazole rings and benzothiazole rings represented by the following general formulae (M-a) to (M-f) are preferable.

(M-a)

(M-b)

(M-c)

(M-d)

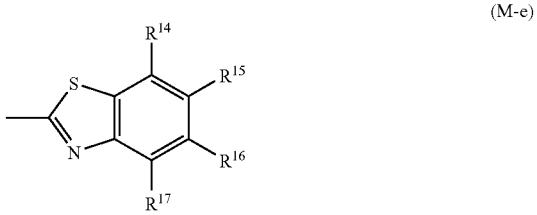

(M-e)

(M-f)

In the general formulae (M-a) to (M-f), $R^7$ to $R^{20}$ respectively represent the same substituent as the substituents G, $R^1$ and $R^2$ as will be explained later.

Pyrazole rings and isothiazole rings represented by the general formulae (M-a) and (M-b) among the general formulae (M-a) to (M-f) are preferable and pyrazole rings represented by the general formula (M-a) are most preferable.

As to $B^1$ and $B^2$, $B^1$ represents $=CR^1-$ and $B^2$ represents $-CR^2=$ or either one of them represents a nitrogen atom and the other represents $=CR^1-$ or $-CR^2=$. Compounds represented by the general formulae (M-a) to (M-b) in which $B^1$ represents $=CR^1-$ and $B^2$ represents $-CR^2=$ are more preferable.

$R^5$ and $R^6$ respectively represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, wherein each group may further have a substituent. Preferable examples of the substituent represented by the general formulae $R^5$ and $R^6$ may include a hydrogen atom, aliphatic group, aromatic group, heterocyclic group, acyl group, alkylsulfonyl group and arylsulfonyl group. The substituent is more preferably a hydrogen atom, aromatic group, heterocyclic group, acyl group, alkylsulfonyl group or arylsulfonyl group. The substituent is most preferably a hydrogen atom, aryl group or heterocyclic group. Each group may further have a substituent. However, $R^5$ and $R^6$ are not hydrogen atoms at the same time.

G, $R^1$ and $R^2$ respectively represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted with an alkyl group, an aryl group or a heterocyclic group, an acylamino group, a ureide group, a sulfamoylamino group, an alkoxycarbonylamino group, an aryloxycarbonylamino group, an alkylsulfonylamino group, an arylsulfonylamino group, a nitro group, an alkylthio group, an arylthio group, a heterocyclic thio group, an alkylsulfonyl group, an arylsulfonyl group, an alkylsulfinyl group, an arylsulfinyl group, a sulfamoyl group or a sulfo group. Each group may be further substituted.

Examples of the substituent represented by G include a hydrogen atom, halogen atom, aliphatic group, aromatic group, hydroxy group, alkoxy group, aryloxy group, acyloxy group, heterocyclic oxy group, amino group substituted with an alkyl group, aryl group or heterocyclic group, acylamino group, ureide group, sulfamoylamino group, alkoxycarbonyl amino group, aryloxycarbonylamino group, alkylthio group, arylthio group and heterocyclic thio group and preferably a hydrogen atom, halogen atom, alkyl group, hydroxy group, alkoxy group, aryloxy group, acyloxy group, amino group substituted with an alkyl group, aryl group or heterocyclic group or acylamino group. Among these groups, a hydrogen atom, arylamino group and amido group are most preferable. Each group may further have a substituent.

Examples of the substituent represented by $R^1$ and $R^2$ may include a hydrogen atom, alkyl group, alkoxycarbonyl group, carboxyl group, carbamoyl group and cyano group. Each group may further have a substituent.

$R^1$ and $R^5$ or $R^5$ and $R^6$ may be combined with each other to form a five-membered or six-membered ring.

In the case where each substituent represented by A, $R^1$, $R^2$, $R^5$, $R^6$ and G has further have a substituent, examples of the substituent may include the substituents given as the examples of G, $R^1$ and $R^2$.

The substituents represented by G, $R^1$ and $R^2$ will be hereinafter explained in detail.

Examples of the halogen atom include a fluorine atom, chlorine atom and bromine atom.

The aliphatic group means an alkyl group, substituted alkyl group, alkenyl group, substituted alkenyl group, alkinyl group, substituted alkinyl group, aralkyl group and substituted aralkyl group. The aliphatic group may be branched or may form a ring. The number of carbons in the aliphatic group is preferably 1 to 20 and more preferably 1 to 16. The aryl part of the aralkyl group or substituted aralkyl group is preferably phenyl or naphthyl and most preferably phenyl. Examples of the aliphatic group may include a methyl group, ethyl group, butyl group, isopropyl group, t-butyl group, hydroxyethyl group, methoxyethyl group, cyanoethyl group, trifluoromethyl group, 3-sulfopropyl group, 4-sulfobutyl group, cyclohexyl group, benzyl group, 2-phenethyl group, vinyl group and allyl group.

In this specification, the aromatic group means an aryl group and substituted aryl group. The aryl group is preferably a phenyl group or naphthyl group and particularly preferably a phenyl group. The number of carbons in the aromatic group is preferably 6 to 20 and more preferably 6 to 16.

Examples of the aromatic group include a phenyl group, p-tolyl group, p-methoxyphenyl group, o-chlorophenyl group and m-(3-sulfopropylamino)phenyl group.

The heterocyclic group include heterocyclic groups having a substituent and unsubstituted heterocyclic groups. The heterocyclic ring may be condensed with an aliphatic ring, aromatic ring or other heterocyclic rings. The heterocyclic group is preferably a five-membered or six-membered heterocyclic group. Examples of the substituent include an aliphatic group, halogen atom, alkylsulfonyl group, arylsulfonyl group, acyl group, acylamino group, sulfamoyl group, carbamoyl group and ionic hydrophilic group. Examples of the heterocyclic group include a 2-pyridyl group, 2-thienyl group, 2-thiazolyl group, 2-benzothiazolyl group, 2-benzooxazolyl group and 2-furyl group.

Examples of the aforementioned alkylsulfonyl group and arylsulfonyl group may include a methanesulfonyl group and a phenylsulfonyl group respectively.

Examples of the aforementioned alkylsulfinyl group and arylsulfinyl group may include a methanesulfonyl group and a phenylsulfinyl group respectively.

The aforementioned acyl group includes acyl groups having a substituent and unsubstituted acyl groups. The acyl group is preferably those having 1 to 12 carbon atoms. Examples of the substituent include an ionic hydrophilic group. Examples of the acyl group include an acetyl group and benzoyl group.

The aforementioned amino group includes amino groups substituted with an alkyl group, aryl group or heterocyclic group, wherein the alkyl group, aryl group and heterocyclic group may further have a substituent. Unsubstituted amino groups are not included. The alkylamino group is preferably an alkylamino group having 1 to 6 carbon atoms. Examples of the substituent include an ionic hydrophilic group. Examples of the alkylamino group include a methylamino group and diethylamino group.

The aforementioned arylamino group includes arylamino groups having a substituent and unsubstituted arylamino groups. The arylamino group is preferably an arylamino group having 6 to 12 carbon atoms. Examples of the substituent include a halogen atom and an ionic hydrophilic group. Examples of the arylamino group include an anilino group and 2-chloroanilino group.

The aforementioned alkoxy group includes alkoxy groups having a substituent and unsubstituted alkoxy groups. The alkoxy group is preferably an alkoxy group having 1 to 12 carbon atoms. Examples of the substituent include an alkoxy group, hydroxyl group and ionic hydrophilic group. Examples of the alkoxy group include a methoxy group, ethoxy group, isopropoxy group, methoxyethoxy group, hydroxyethoxy group and 3-carboxypropoxy group.

The aforementioned aryloxy group include aryloxy groups having a substituent and unsubstituted aryloxy groups. The aryloxy group is preferably an aryloxy group having 6 to 12 carbon atoms. Examples of the substituent include an alkoxy group and an ionic hydrophilic group. Examples of the aryloxy group include a phenoxy group, p-methoxyphenoxy group and o-methoxyphenoxy group.

The aforementioned acylamino group include acylamino groups having a substituent. The acylamino group is preferably an acylamino group having 2 to 12 carbon atoms. Examples of the substituent include an ionic hydrophilic group. Examples of the acylamino group include an acetylamino group, propionylamino group, benzoylamino group, N-phenylacetylamino and 3,5-disulfobenzoylamino group.

The aforementioned ureide group include ureide groups having a substituent and unsubstituted ureide groups. The ureide group is preferably an ureide group having 1 to 12 carbon atoms. Examples of the substituent include an alkyl group and aryl group. Examples of the ureide group include 3-methylureide group, 3,3-dimethylureide group and 3-phenylureide group.

The aforementioned sulfamoylamino group include sulfamoylamino groups having a substituent and unsubstituted sulfamoylamino groups. Examples of the substituent include an alkyl group. Examples of the sulfamoylamino group include a N,N-dipropylsulfamoylamino group.

The aforementioned alkoxycarbonylamino group include alkoxycarbonylamino groups having a substituent and unsubstituted alkoxycarbonylamino groups. The alkoxycarbonylamino group is preferably an alkoxycarbonylamino group having 2 to 12 carbon atoms. Examples of the substituent include an ionic hydrophilic group. Examples of the alkoxycarbonylamino group include an ethoxycarbonylamino group.

The aforementioned alkylsulfonylamino group and arylsulfonylamino group include alkyl or arylsulfonylamino groups having a substituent and unsubstituted alkyl or arylsulfonylamino groups. The alkyl or arylsulfonylamino group is preferably an alkyl or arylsulfonylamino group having 1 to 12 carbon atoms. Examples of the substituent include an ionic hydrophilic group. Examples of the alkyl or arylsulfonylamino group include a methanesulfonylamino group, N-phenylmethanesulfonylamino group, benzenesulfonylamino group and 3-carboxybenzenesulfonylamino group.

The aforementioned carbamoyl group includes carbamoyl groups having a substituent and unsubstituted carbamoyl groups. Examples of the substituent include an alkyl group. Examples of the carbamoyl group include a methylcarbamoyl group and dimethylcarbamoyl group.

The aforementioned sulfamoyl group includes sulfamoyl groups having a substituent and unsubstituted sulfamoyl groups. Examples of the substituent include an alkyl group. Examples of the sulfamoyl group include a dimethylsulfamoyl group and di-(2-hydroxyethyl)sulfamoyl group.

The aforementioned alkoxycarbonyl group includes alkoxycarbonyl groups having a substituent and unsubstituted alkoxycarbonyl groups. The alkoxycarbonyl group is preferably an alkoxycarbonyl group having 2 to 12 carbon atoms. Examples of the substituent include an ionic hydrophilic group. Examples of the alkoxycarbonyl group include a methoxycarbonyl group and ethoxycarbonyl group.

The aforementioned acyloxy group includes acyloxy groups having a substituent and unsubstituted acyloxy groups. The acyloxy group is preferably an acyloxy group having 1 to 12 carbon atoms. Examples of the substituent include an ionic hydrophilic group. Examples of the acyloxy group include an acetoxy group and benzoyloxy group.

The aforementioned carbamoyloxy group includes carbamoyloxy groups having a substituent and unsubstituted carbamoyloxy groups. Examples of the substituent include an alkyl group. Examples of the carbamoyloxy group include a N-methylcarbamoyloxy group.

The aforementioned aryloxycarbonyl group includes aryloxycarbonyl groups having a substituent and unsubstituted aryloxycarbonyl groups. The aryloxycarbonyl group is preferably an aryloxycarbonyl group having 7 to 12 carbon atoms. Examples of the substituent include an ionic hydrophilic group. Examples of the aryloxycarbonyl group include a phenoxycarbonyl group.

The aforementioned aryloxycarbonylamino group includes aryloxycarbonylamino groups having a substituent and unsubstituted aryloxycarbonylamino groups. The aryloxycarbonylamino group is preferably an aryloxycarbonylamino group having 7 to 12 carbon atoms. Examples of the substituent include an ionic hydrophilic group. Examples of the aryloxycarbonylamino group include a phenoxycarbonylamino group.

The aforementioned alkyl, aryl or heterocyclic thio group includes alkyl, aryl or heterocyclic thio groups having a substituent and unsubstituted alkyl, aryl or heterocyclic thio groups. The alkyl, aryl or heterocyclic thio group is preferably an alkyl, aryl or heterocyclic group having 1 to 12 carbon atoms. Examples of the substituent include an ionic hydrophilic group. Examples of the alkyl, aryl or heterocyclic group include a methylthio group, phenylthio group and 2-pyridylthio group.

Particularly preferable azo dyes in the invention are compounds represented by the following general formula (M-II).

General formula (M-II)

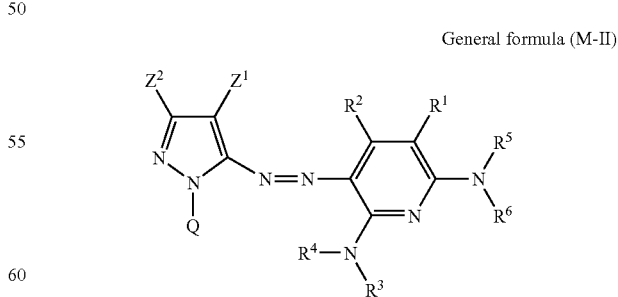

In the general formula (M-II), $Z^1$ represents an electron attractive group having a Hammett's substituent constant $\sigma_p$ value of 0.20 or more. $Z^1$ is preferably an electron attractive group having a Hammett's substituent constant $\sigma_p$ value of 0.30 to 1.0. Preferable and specific examples of the substituent may include electron attractive substituents explained later. Among these electron attractive groups, an acyl group having 2 to 12 carbon atoms, alkyloxycarbonyl group having 2 to 12 carbon atoms, nitro group, cyano group, alkylsulfonyl group having 1 to 12 carbon atoms, arylsulfonyl group having 6 to 18 carbon atoms, carbamoyl group having 1 to 12 carbon atoms and alkyl halide group having 1 to 12 carbon atoms are preferable. An cyano group, alkylksulfonyl group having 1 to 12 carbon atoms and arylsulfonyl group having 6 to 18 carbon atoms are particularly preferable and a cyano group is most preferable.

$R^1$, $R^2$, $R^5$ and $R^6$ have the same meanings as those in the general formula (M-I).

$R^3$ and $R^4$ respectively represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group. Among these groups, a hydrogen atom, aromatic group, heterocyclic group, acyl group, alkylsulfonyl group and arylsulfonyl group are preferable and a hydrogen atom, aromatic group and heterocyclic group are particularly preferable.

$Z^2$ represents a hydrogen atom, an aliphatic group, an aromatic group or a heterocyclic group.

Q represents a hydrogen atom, an aliphatic group, an aromatic group or a heterocyclic group. Q is preferably a group composed of a nonmetal atomic group necessary to form five-membered to eight-membered rings among these groups. These five-membered to eight-membered rings may be substituted, and may be saturated rings or may have an unsaturated bond. Among these groups, an aromatic group and heterocyclic group are preferable. Preferable examples of the nonmetal atom include a nitrogen atom, oxygen atom, sulfur atom and carbon atom. Specific examples of the five- to eight-membered rings include a benzene ring, cyclopentane ring, cyclohexane ring, cycloheptane ring, cyclooctane ring, cyclohexene ring, pyridine ring, pyrimidine ring, pyrazine ring, pyridazine ring, triazine ring, imidazole ring, benzoimidazole ring, oxazole ring, benzoxazole ring, thiazole ring, benzothiazole ring, oxane ring, sulfolane ring and thian ring.

Each group explained in the general formula (M-II) may further have a substituent. When each of these groups further has a substituent, examples of the substituent include the substituents explained in the general formula (M-I) and the groups exemplified for G, $R^1$ and $R^2$ and ionic hydrophilic groups.

Here, the Hammett's substituent constant $\sigma_p$ value used in this specification will be explained in relation to the substituent $Z^1$.

The Hammett's rule is a rule of thumb proposed by L. P. Hammett in 1935 to discuss the effect of a substituent on the reaction or equilibrium of a benzene derivative quantitatively. The validity of this rule is widely admitted at present. The substituent constant found by the Hammett's rule includes an $\sigma_p$ value and an $\sigma_m$ value and these values are found in general fair books, for example, in J. A. Dean edition "Lange's Handbook of Chemistry" 12th edition, 1979 (McGraw-Hill) and "Area of Chemistry" Special Number, No. 122, pp. 96–103, 1979 (Nanko-Do) in which these values are described in detail. In the invention, each substituent is limited or explained using the Hammett's substituent constant $\sigma_p$ value. It is needless to say that this does not imply a limitation to only substituents for which the value concerned is found in the reference of the above fair book, but involves substituents whose values will be embraced in its range when the values are measured based on the Hammett's rule even if the value is unknown in literature. Also, though compounds which are not benzene derivatives are included in the compounds represented by the general formulae (M-I) and (M-II) in the invention, the $\sigma_p$ value is used as a measure showing the electron effect of a substituent irrespective of the position of substitution. Therefore, in the invention, the $\sigma_p$ value is used in this meaning.

Examples of an electron attractive group having a Hammett's substituent constant $\sigma_p$ value of 0.60 or more may include a cyano group, nitro group and alkylsulfonyl group (e.g., a methanesulfonyl group and arylsulfonyl group (e.g., a benzenesulfonyl group)).

Examples of an electron attractive group having a Hammett's substituent constant $\sigma_p$ value of 0.45 or more may include, besides the above groups, an acyl group (e.g., an acetyl group), alkoxycarbonyl group (e.g., a dodecyloxycarbonyl group), aryloxycarbonyl group (e.g., a m-chlorophenoxycarbonyl group), alkylsulfinyl group (e.g., a n-propylsulfinyl group), arylsulfinyl group (e.g., a phenylsulfinyl group), sulfamoyl group (e.g., a N-ethylsulfamoyl group and N,N-dimethylsulfamoyl group) and alkyl halide group (e.g., a trifluoromethyl group).

Examples of an electron attractive group having a Hammett's substituent constant $\sigma_p$ value of 0.30 or more may include, besides the above groups, an acyloxy group (e.g., an acetoxy group), carbamoyl group (e.g., a N-ethylcarbamoyl group and N.N-dibutylcarbamoyl group), alkoxy halide group (e.g., a trifluoromethyloxy group), aryloxy halide group (e.g., a pentachlorophenyloxy group), sulfonyloxy group (e.g., a methylsulfonyloxy group), alkylthio halide group (e.g., a difluoromethylthio group), aryl group substituted with two or more electron attractive groups having an $\sigma_p$ value of 0.15 or more (e.g., a 2,4-dinitrophenyl group and pentachlorophenyl group) and hetero ring (e.g., a 2-benzoxazolyl group, 2-benzothiazolyl group and 1-phenyl-2-benzimidazolyl group).

Examples of an electron attractive group having a Hammett's substituent constant $\sigma_p$ value of 0.20 or more may include, besides the above groups, a halogen atom.

Particularly preferable combinations of the substituents in the compound represented by the general formula (M-I) are as follows:

(i) $R^5$ and $R^6$ are respectively preferably a hydrogen atom, an alkyl group, an aryl group, a heterocyclic group, a sulfonyl group or an acyl group, more preferably a hydrogen atom, an aryl group, a heterocyclic group or a sulfonyl group and most preferably a hydrogen atom, an aryl group or a heterocyclic group, provided that $R^5$ and $R^6$ are not hydrogen atoms at the same time;

(ii) G is preferably a hydrogen atom, a halogen atom, an alkyl group, a hydroxyl group, an amino group or an amido group, more preferably a hydrogen atom, a halogen atom, an amino group or an amido group and most preferably a hydrogen atom, an amino group or an amido group;

(iii) A is preferably a pyrazole ring, an imidazole ring, an isothiazole ring, a thiadiazole ring or benzothiazole ring, more preferably a pyrazole ring or an isothiazole ring and most preferably a pyrazole ring; and (iv) $B^1$ and $B^2$ are =$CR^1$— and —$CR^2$= respectively. $R^1$ and $R^2$ are respectively preferably a hydrogen atom, a halogen atom, a cyano group, a carbamoyl group, a carboxyl group, an alkyl group, a hydroxyl group or an alkoxy group and more preferably a hydrogen atom, a cyano group, a carbamoyl group or an alkoxy group.

As to preferable combinations of the substituents in the compounds represented by the general formula (M-I), compounds in which at least one of various substituents is the aforementioned preferable group are preferable, compounds in which more, various substituents are the aforementioned preferable groups are more preferable and compounds in which all substituents are the aforementioned preferable groups are most preferable.

The exemplified compounds (a-1 to a-27, b-1 to b-6, c-1 to c-3, d-1 to d-4 and e-1 to e-4) of the compound represented by the general formula (M-I) are described in Paragraphs Nos. [0190] to [0198] of the JP-A No. 2003-73598: however, the compound used in the invention is not limited to the following examples.

As the oil-soluble dye in the invention, compounds represented by the following general formula (C-I) (hereinafter sometimes referred to as "phthalocyanine dye") are preferably used. These compounds represented by the general formula (C-I) will be explained hereinbelow.

General formula (C-I)

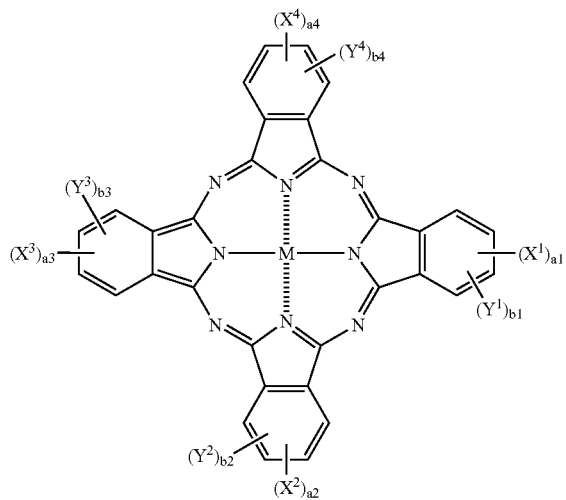

In the general formula (C-I), $X^1$, $X^2$, $X^3$ and $X^4$ respectively represent —SO-$Z^1$, —SO$_2$-$Z^1$ or —SO$_2$NR$^{21}$R$^{22}$.

$Z^1$ represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group and particularly preferably a substituted or unsubstituted alkyl group, a substituted or unsubstituted aryl group or a substituted or unsubstituted heterocyclic group. Among these groups, a substituted alkyl group or a substituted aryl group or a substituted heterocyclic group is most preferable.

$R^{21}$ and $R^{22}$ respectively represent a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group and particularly preferably a hydrogen atom, a substituted or unsubstituted alkyl group, a substituted or unsubstituted aryl group or a substituted or unsubstituted heterocyclic group. Among these groups, a hydrogen atom, a substituted alkyl group or a substituted aryl group or a substituted heterocyclic group is most preferable, provided that $R^{21}$ and $R^{22}$ are not both hydrogen atoms at the same time.

The substituted or unsubstituted alkyl group represented by $R^{21}$, $R^{22}$ or $Z^1$ is preferably an alkyl group having 1 to 30 carbon atoms. Examples of the substituent include the same substituents as in the case where $Z^1$, $R^{21}$, $R^{22}$, $Y^1$, $Y^2$, $Y^3$ and $Y^4$ which will be explained later may further have a substituent. Among these groups, a hydroxyl group, alkoxy group, cyano group and halogen atom are preferable.

The cycloalkyl group having a substituent or unsubstituted cycloalkyl group which groups are represented by $R^{21}$, $R^{22}$ or $Z^1$ is preferably a cycloalkyl group having 5 to 30 carbon atoms. Examples of the substituent include the same substituents as in the case where $Z^1$, $R^{21}$, $R^{22}$, $Y^1$, $Y^2$, $Y^3$ and $Y^4$ which will be explained later may further have a substituent. Among these groups, a hydroxyl group, alkoxy group, cyano group and halogen atom are preferable.

The alkenyl group having a substituent or unsubstituted alkenyl group which groups are represented by $R^{21}$, $R^{22}$ or $Z^1$ is preferably an alkenyl group having 2 to 30 carbon atoms. Examples of the substituent include the same substituents as in the case where $Z^1$, $R^{21}$, $R^{22}$, $Y^1$, $Y^2$, $Y^3$ and $Y^4$ which will be explained later may further have a substituent. Among these groups, a hydroxyl group, alkoxy group, cyano group and halogen atom are preferable.

The aralkyl group having a substituent or unsubstituted aralkyl group which groups are represented by $R^{21}$, $R^{22}$ or $Z^1$ is preferably an aralkyl group having 7 to 30 carbon atoms. Examples of the of the substituent include the same substituents as in the case where $Z^1$, $R^{21}$, $R^{22}$, $Y^1$, $Y^2$, $Y^3$ and $Y^4$ which will be explained later may further have a substituent. Among these groups, a hydroxyl group, alkoxy group, cyano group and halogen atom are preferable.

Examples of the substituent of the aryl group represented by $R^{21}$, $R^{22}$ or $Z^1$ include the same substituents as in the case where $Z^1$, $R^{21}$, $R^{22}$, $Y^1$, $Y^2$, $Y^3$ and $Y^4$ which will be explained later may further have a substituent. Preferable examples of the substituent include a halogen atom, heterocyclic group, cyano group, hydroxyl group, nitro group, carboxyl group, acylamino group, ureide group, sulfamoylamino group, alkyloxycarbonyl group, alkyloxycarbonylamino group, sulfonamide group, sulfamoyl group, carbamoyl group, sulfonyl group, acyloxy group, carbamoyloxy group, imide group, heterocyclic thio group, acyl group, sulfo group and quaternary ammonium group. Among these groups, a heterocyclic group, cyano group, carboxyl group, acylamino group, sulfonamide group, sulfamoyl group, carbamoyl group, sulfonyl group, imide group and acyl group are preferable and a cyano group, carboxyl group, sulfamoyl group, carbamoyl group, sulfonyl group, imide group and acyl group are more preferable.

The heterocyclic group represented by $R^{21}$, $R^{22}$ or $Z^1$ is preferably a five-membered or six-membered one, which may be further ring-condensed. Also, the heterocyclic group may be an aromatic hetero ring or non-aromatic hetero ring.

The heterocyclic groups represented by $R^{21}$, $R^{21}$ or $Z^1$ will be exemplified in the form of a hetero ring hereinbelow though the position of substitution is omitted. There is no limitation to the position of substitution and in the case of, for example, pyridine, it may be substituted at the second, third and fourth positions.

Specifically, examples of the heterocyclic group include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzoimidazole, triazole, oxazole, benzoxazole, thiazole, benzothiazole, isothiazole, benzoisothiazole, thiadiazole, isooxazole, benzoisooxazole, pyrrolidine, piperidine, piperazine, imidazolidine and thiazoline. Among these groups, aromatic heterocyclic groups are preferable. If preferable examples of the aromatic heterocyclic group are exemplified in the same way as above, pyridine, pyrazine, pyrimidine, pyridazine, triazine, pyrazole, imidazole, benzoimidazole, triazole, thiazole, benzothiazole, isothiazole, benzoisothiazole and thiadiazole are given as examples. These may have a substituent.

$Y^1$, $Y^2$, $Y^3$ and $Y^4$ respectively represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureide group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, a carboxyl group or a sulfo group. Each group may further have a substituent.

Among these groups, a hydrogen atom, halogen atom, alkyl group, aryl group, cyano group, alkoxy group, amido group, ureide group, sulfonamido group, carbamoyl group, sulfamoyl group and alkoxycarbonyl group are preferable, a hydrogen atom, halogen atom and cyano group are particularly preferable and a hydrogen atom is most preferable.

When $Z^1$, $R^{21}$, $R^{22}$, $Y^1$, $Y^2$, $Y^3$ and $Y^4$ are groups which may have a substituent, they may further have substituents exemplified in the following.

Examples of the substituent include a halogen atom (e.g., a chlorine atom and bromine atom), straight-chain or branched alkyl group having 1 to 30 carbon atoms, aralkyl group having 7 to 30 carbon atoms, alkenyl group having 2 to 30 carbon atoms, straight-chain or branched alkinyl group having 2 to 30 carbon atoms, straight-chain or branched cycloalkyl group having 3 to 30 carbon atoms, straight-chain or branched cycloalkenyl group having 3 to 30 carbon atoms, specifically, (e.g., methyl, ethyl, propyl, isopropyl, t-butyl, 2-methanesulfonylethyl, 3-phenoxypropyl, trifluoromethyl and cyclopentyl), aryl group (e.g., phenyl, 4-t-butylphenyl and 2,4-di-t-amylphenyl), heterocyclic group (e.g., imidazolyl, pyrazolyl, triazolyl, 2-furyl, 2-thienyl, 2-pyrimidinyl and 2-benzothiazolyl), cyano group, hydroxyl group, nitro group, carboxy group, amino group, alkyloxy group (e.g., methoxy, ethoxy, 2-methoxyethoxy and 2-methanesulfonylethoxy), aryloxy group (e.g., phenoxy, 2-methylphenoxy, 4-t-butylphenoxy, 3-nitrophenoxy, 3-t-butyloxycarbamoylphenoxy and 3-methoxycarbamoyl), acylamino group (e.g., acetamide, benzamide and 4-(3-t-butyl-4-hydroxyphenoxy)butanamide), alkylamino group (e.g., methylamino, butylamino, diethylamino and methylbutylamino), anilino group (e.g., phenylamino and 2-chloroanilino), ureide group (e.g., phenylureide, methylureide and N,N-dinutylureide, sulfamoylamino group (e.g., N,N-dipropylsulfamoylamino), alkylthio group (e.g., methylthio, octylthio and 2-phenoxyethylthio), arylthio group (e.g., phenylthio, 2-butoxy-5-t-octylphenylthio and 2-carboxyphenylthio), alkyloxycarbonylamino group (e.g., methoxycarbonylamino), sulfonamido group (e.g., methanesulfonamide, benzenesulfonamide and p-toluenesulfonamide), carbamoyl group (e.g., N-ethylcarbamoyl and N,N-dibutylcarbamoyl), sulfamoyl group (e.g., N-ethylsulfamoyl, N,N-dipropylsulfamoyl and N-phenylsulfamoyl), sulfonyl group (e.g., methanesulfonyl, octanesulfonyl, benzenesulfonyl and toluenesulfonyl), alkyloxycarbonyl group (e.g., methoxycarbonyl and butyloxycarbonyl), heterocyclic oxy group (e.g., 1-phenyltetrazole-5-oxy and 2-tetrahydropyranyloxy), azo group (e.g., phenylazo, 4-methoxyphenylazo, 4-pivaloylaminophenylazo, 2-hydroxy-4-propanoylphenylazo), acyloxy group (e.g., acetoxy), carbamoyloxy group (e.g., N-methylcarbamoyloxy and N-phenylcarbamoyloxy), silyloxy group (e.g., trimethylsilyloxy and dibutylmethylsilyloxy), aryloxycarbonylamino group (e.g., phenoxycarbonylamino), imide group (e.g., N-succinimide and N-phthalimide), heterocyclic thio group (e.g., 2-benzothiazolylthio, 2,4-di-phenoxy-1,3,5-triazole-6-thio and 2-pyridiylthio), sulfinyl group (e.g., 3-phenoxypropylsulfinyl), phosphonyl group (e.g., phenoxyphosphonyl, octyloxyphosphonyl and phenylphosphonyl), aryloxycarbonyl group (e.g., phenoxycarbonyl), acyl group (e.g., acetyl, 3-phenylpropanoyl and benzoyl) and ionic hydrophilic group (e.g., a carboxyl group, sulfo group and quaternary ammonium group).

$a^1$ to $a^4$ and $b^1$ to $b^4$ respectively denote the number of the substituents of $X^1$ to $X^4$ and $Y^1$ to $Y^4$. $a^1$ to $a^4$ respectively denote an integer from 0 to 4 and $b^1$ to $b^4$ respectively denote an integer from 0 to 4, provided that the sum of $a^1$ to $a^4$ is 2 or more. Here, when $a^1$ to $a^4$ and $b^1$ to $b^4$ denote integers of 2 or more, plural $X^1$s to $X^4$s and $Y^1$s to $Y^4$s may respectively be the same or different.

$a^1$ and $b^1$ respectively denote an integer from 0 to 4 and satisfy the relationship: $a^1+b^1=4$. In particularly preferable combinations, $a^1$ denotes 1 or 2 and $b^1$ denotes 3 or 2. Among these combinations, a combination in which $a^1$ denotes 1 and $b^1$ denotes 3 is most preferable.

$a^2$ and $b^2$ respectively denote an integer from 0 to 4 and satisfy the relationship: $a^2+b^2=4$. In particularly preferable combinations, $a^2$ denotes 1 or 2 and $b^2$ denotes 3 or 2. Among these combinations, a combination in which $a^2$ denotes 1 and $b^2$ denotes 3 is most preferable.

$a^3$ and $b^3$ respectively denote an integer from 0 to 4 and satisfy the relationship: $a^3+b^3=4$. In particularly preferable combinations, $a^3$ denotes 1 or 2 and $b^3$ denotes 3 or 2. Among these combinations, a combination in which $a^3$ denotes 1 and $b^3$ denotes 3 is most preferable.

$a^4$ and $b^4$ respectively denote an integer from 0 to 4 and satisfy the relationship: $a^4+b^4=4$. In particularly preferable combinations, $a^4$ denotes 1 or 2 and $b^4$ denotes 3 or 2. Among these combinations, a combination in which $a^4$ denotes 1 and $b^4$ denotes 3 is most preferable.

M represents a hydrogen atom or a metal element or its oxide, hydroxide or halide.

Preferable examples of M include a hydrogen atom and metal atoms such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi. Examples of the oxide include VO and GeO. Also, examples of the hydroxide include $Si(OH)_2$, $Cr(OH)_2$ and $Sn(OH)_2$. Further, examples of the halide include $AlCl$, $SiCl_2$, $VCl$, $VCl_2$, $VOCl$, $FeCl$, $GaCl$ and $ZrCl$. Among these examples, Cu, Ni, Zn, Al and the like are particularly preferable and Cu is most preferable.

Also, Pc (phthalocyanine ring) may form a dimer (e.g., Pc-M-L-M-Pc) or a trimer through L (divalent connecting group) In this case, Ms may be the same or different.

The divalent connecting group represented by L is preferably an oxy group (—O—), thio group (—S—), carbonyl group (—CO—), sulfonyl group (—$SO_2$—), imino group (—NH—) or methylene group (—$CH_2$—).

Particularly preferable combinations as the compound represented by the general formula (C-I) are as follows.

$X^1$ to $X^4$ are particularly preferably —$SO_2$-$Z^1$ or —$SO_2NR^{21}R^{22}$ respectively.

$Z^1$s are respectively preferably a substituted or unsubstituted alkyl group, substituted or unsubstituted aryl group or substituted or unsubstituted heterocyclic group. Among these groups, a substituted alkyl group, substituted aryl group and substituted heterocyclic group are most preferable.

$R^{21}$ and $R^{22}$ respectively preferably a hydrogen atom, substituted or unsubstituted alkyl group, substituted or unsubstituted aryl group or substituted or unsubstituted heterocyclic group. Among these groups, a hydrogen atom, substituted alkyl group, substituted aryl group and substituted heterocyclic group are most preferable.

$Y^1$ to $Y^4$ are respectively preferably a hydrogen atom, alkyl group, aryl group, cyano group, alkoxy group, amido group, ureide group, sulfonamido group, carbamoyl group, sulfamoyl group, alkoxycarbonyl group, carboxyl group or sulfo group, particularly preferably a hydrogen atom, halogen atom, cyano group, carboxyl group or sulfo group and most preferably a hydrogen atom.

$a^1$ to $a^4$ are respectively preferably 1 or 2 and particularly preferably 1 and $b^1$ to $b^4$ are respectively preferably 3 or 2 and particularly preferably 3.

M represents a hydrogen atom or a metal element or its oxide, hydroxide or halide, is preferably Cu, Ni, Zn or Al and is most preferably Cu.

As to the combination of the substituents in the compounds represented by the general formula (C-I), compounds in which at least one of various substituents is the aforementioned preferable group are preferable, compounds in which more, various substituents are the aforementioned preferable groups are more preferable and compounds in which all substituents are the aforementioned preferable groups are most preferable.

Among the compounds represented by the general formula (C-I), compounds having a structure represented by the following general formula (C-II) are more preferable.

General formula (C-II)

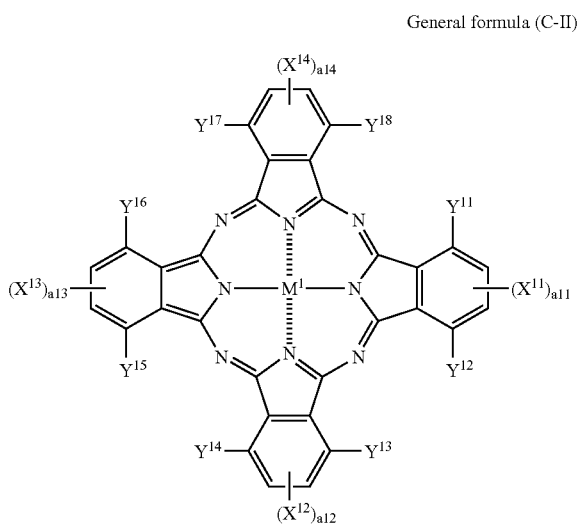

In the general formula (C-II), $X^{11}$ to $X^{14}$ and $Y^{11}$ to $Y^{18}$ have the same meanings as $X^1$ to $X^4$ and $Y^1$ to $Y^4$ in the general formula (C-I) and preferable examples are also the same. Also, $M^1$ has the same meanings as M in the general formula (C-I) and preferable examples are also the same.

Specifically, $X^{11}$, $X^{12}$, $X^{13}$ and $X^{14}$ in the general formula (C-II) respectively represent —SO-$Z^{11}$, —$SO_2$-$Z^{11}$ or —$SO_2NR^{23}R^{24}$.

$Z^{11}$ represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group.

$R^{23}$ represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group. $R^{24}$ represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group.

$Y^{11}$, $Y^{12}$, $Y^{13}$, $Y^{14}$, $Y^{15}$, $Y^{16}$, $Y^{17}$ and $Y^{18}$ respectively represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureide group, a sulfamoylamino group, an alkylthio group, an arylthio group, an alkoxycarbonylamino group, a sulfonamido group, a carbamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, a carboxyl group or a sulfo group. Each group may further have a substituent.

$a^{11}$ to $a^{14}$ represent the numbers of the substituents of $X^{11}$ to $X^{14}$ respectively and respectively represent an integer from 0 to 2, provided that all of $a^{11}$ to $a^{14}$ are not 0 at the same time. When $a^{11}$ to $a^{14}$ respectively represent 2, two of each of $X^{11}$ to $X^{14}$ may be the same or different.

$M^1$ represents a hydrogen atom or a metal element or its oxide, hydroxide or halide.

In the general formula (C-II), $a^{11}$ to $a^{14}$ respectively represent an integer of 1 or 2 within the range meeting the following equation: $4 \leq a^{11}+a^{12}+a^{13}+a^{14} \leq 8$ and particularly preferably the following equation: $4 \leq a^{11}+a^{12}+a^{13}+a^{14} \leq 6$. Among these cases, the case where $a^{11}=a^{12}=a^{13}=a^{14}=1$ is particularly preferable.

Particularly preferable combinations of the substituents in the compounds represented by the general formula (C-II) are as follows.

As $X^{11}$ to $X^{14}$, —$SO_2$-$Z^{11}$ or —$SO_2NR^{23}R^{24}$ is particularly preferable respectively.

$Z^{11}$s are respectively preferably a substituted or unsubstituted alkyl group, a substituted or unsubstituted aryl group or a substituted or unsubstituted heterocyclic group. Among these groups, a substituted alkyl group, substituted aryl group and substituted heterocyclic group are most preferable.

$R^{23}$s are respectively preferably a hydrogen atom, a substituted or unsubstituted alkyl group, a substituted or unsubstituted aryl group or a substituted or unsubstituted heterocyclic group. Among these groups, a hydrogen atom, substituted alkyl group, substituted aryl group and substituted heterocyclic group are most preferable.

$R^{24}$s are respectively preferably a substituted or unsubstituted alkyl group, a substituted or unsubstituted aryl group or a substituted or unsubstituted heterocyclic group. Among these groups, a substituted alkyl group, substituted aryl group and substituted heterocyclic group are most preferable.

$Y^{11}$ to $Y^{18}$ are respectively preferably a hydrogen atom, a halogen atom, an alkyl group, an aryl group, a cyano group, an alkoxy group, an amido group, a ureide group, a sulfonamido group, a carbamoyl group, a sulfamoyl group or an alkoxycarbonyl group, particularly preferably a hydrogen atom, a halogen atom or a cyano group and most preferably a hydrogen atom.

$a^{11}$ to $a^{14}$ are respectively preferably 1 or 2 and particularly preferably all 1.

$M^1$ represents a hydrogen atom or a metal element or its oxide, hydroxide or halide, is preferably Cu, Ni, Zn or Al and most preferably Cu among these metal elements.

As to the combination of the substituents in the compounds represented by the general formula (C-II), compounds in which at least one of various substituents is the aforementioned preferable group are preferable, compounds in which more, various substituents are the aforementioned preferable groups are more preferable and compounds in which all substituents are the aforementioned preferable groups are most preferable.

The compound represented by the general formula (C-I) is, in a usual case, a mixture of analogues differing in the position and number of substituents Rn (n=1 to 4) and Yq (q=1 to 4) inevitably depending on its synthetic method. In many cases, a mixture of these analogues is averaged statistically when expressed. It has been found in the invention that if the mixture of these analogues is classified into three categories shown below, a specific mixture is particularly preferable.

In the invention, a mixture of phthalocyanine type dye analogues which are the compound represented by the general formulae (C-I) and (C-II) is classified into the following three categories based on the position of substitution to define.

(1) β-position substitution type: (phthalocyanine type dyes having specified substituents at a 2nd and/or 3rd position, 6th and/or 7th position, 10th or 11th position and 14th or 15th position).
(2) α-position substitution type: (phthalocyanine type dyes having specified substituents at a 1st and/or 4th position, 5th and/or 8th position, 9th or 12th position and 13th or 16th position).
(3) α,β-position mixed substitution type: (phthalocyanine type dyes having a specified substituent at 1st to 16th positions without any regularity.

In the case of explaining phthalocyanine type dye derivatives having different structures (especially, the position of substitution) in this specification, the β-position substitution type, α-position substitution type and α,β-position mixed substitution type are used.

The phthalocyanine derivatives to be used in the invention may be synthesized by the methods described or cited in, for example, "Phthalocyanine-Chemistry and Function" written by SHIRAI jointly with KOBAYASHI, published by IPC Publishing (pp. 1–62) and "Phthalocyanines-Properties and Applications" written by C. C. Leznoff jointly with A. B. P. Lever, published by VCH, (pp. 1–54), the disclosures of which are incorporated by reference, or by combining similar methods.

The compound represented by the general formula (C-I) in the invention may be synthesized, for example, through sulfonation, sulfonyl chlorination and amide reaction of an unsubstituted phthalocyanine compound as described in each publication of WO00/17275, WO00/08103, WO00/08101, WO98/41853 and JP-A No. 10-36471. In this case, the sulfonation possibly takes place at any position of a phthalocyanine nucleus and also, it is difficult to control the number of molecules to be sulfonated. Therefore, when introducing a sulfo group in such a reaction condition, the position and number of the sulfo group cannot be specified, always providing a mixture differing in the number and position of a substituent. Therefore, when synthesizing the compound used in the invention by using the mixture as starting material, the compound according to the invention is obtained as a mixture of α,β-position substitution types containing several types of compound differing in the number and position of a substituent.

As mentioned above, when many electron attractive groups such as a sulfamoyl group are introduced into a phthalocyanine nucleus, oxidation potential is nobler, so that ozone resistance is heightened. According to the aforementioned synthetic method, phthalocyanine dyes decreased in the number of electron attractive groups, namely phthalocyanine dyes having poor oxidation potential are inevitably mixed. It is therefore preferable to adopt such a synthetic method as to suppress the production of compounds poor in oxidation potential in order to improve ozone resistance.

Meanwhile, the compound represented by the general formula (C-II) according to the invention may be derived from a compound obtained by reacting, for example, a phthalonitrile derivative (compound P) and/or a diiminoisoindoline derivative (compound Q) which are/is represented the following formulae with a metal derivative represented by the following general formula (C-III).

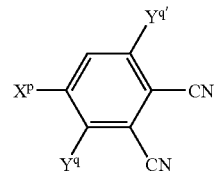

(Compound P)

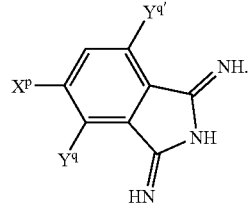

(Compound Q)

In the compounds P and Q, p denotes 11 to 14 and q and q' respectively denote 11 to 18.

$M-(Y)_d$  General Formula (C-III)

In the general formula (C-III), M has the same meanings as M in the compound represented by the general formulae (C-I) and (C-II), Y represents a monovalent or divalent ligand such as a halogen atom, an acetic acid anion, an acetylacetonate or oxygen and d denotes an integer from 1 to 4.

Namely, according to the above synthetic method, only the specified number of desired substituents can be introduced. Particularly in the case of intending to introduce an electron attractive group in greater numbers to heighten oxidation potential as shown in the invention, the above synthetic method is very superior to the method of synthesizing the compound represented by the general formula (C-I).

The compound represented by the general formula (C-II) which is thus obtained is usually a mixture of compounds which are isomers based on each substitution position of $X^p$ and resented by the following general formulae (C-II-1) to (C-II-4), specifically a β-position substitution type (phthalocyanine dyes having a specified substituent at 2nd and/or 3rd position, 6th and/or 7th position, 10th and/or 11th position and 14th to 15th position.

General formula (C-II-1)

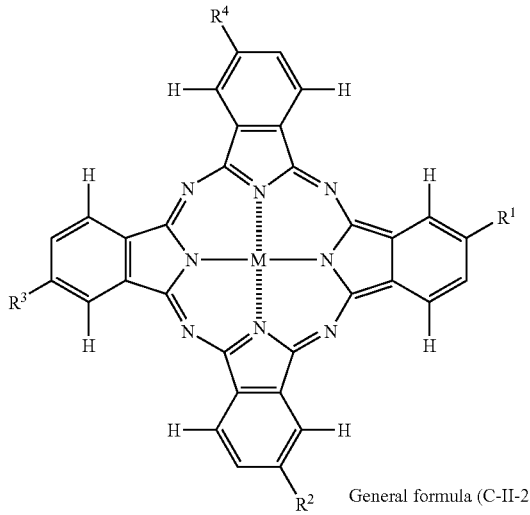

General formula (C-II-2)

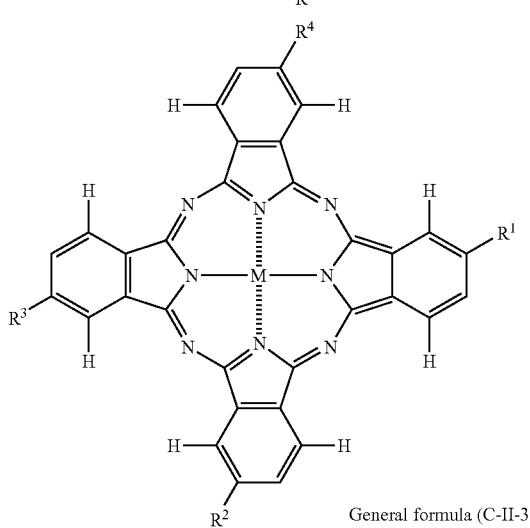

General formula (C-II-3)

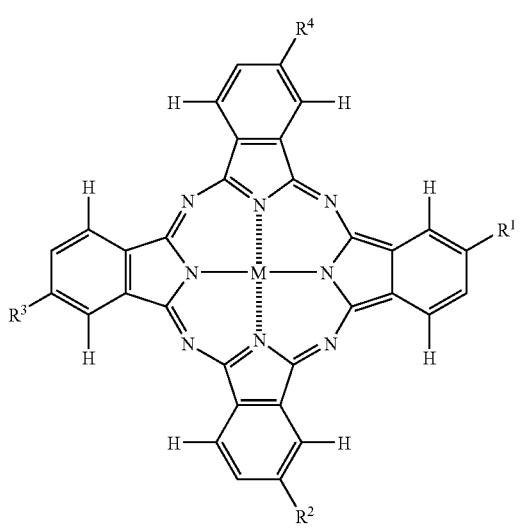

-continued

General formula (C-II-4)

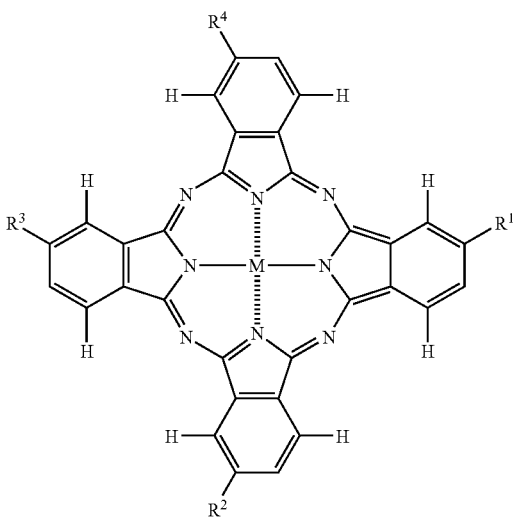

In the above general formula (C-II-1) to (C-II-4), $R^1$ to $R^4$ have the same meanings as $(X^{11})a^{11}$ to $(X^{14})a^{14}$ in the above general formula (C-II) respectively.

It has been found in the invention that it is very important that in all substitution types, oxidation potential is nobler than 1.0 V (vs SCE), to improve fastness. Among these types, there is a tendency that a β-position substitution type is superior to an α, β-position mixed substitution type in a hue, light fastness and ozone gas resistance.

The exemplified compounds (C-101 to C120) of the compounds represented by the general formula (C-I) or (C-II) are shown in Paragraph Nos. [0264] to [0267] of JP-A No. 2003-73598, the disclosures of which is incorporated by reference. The invention is not limited by the following examples.

The compound represented by the general formula (C-I) may be synthesized according to the aforementioned patent. Also, the compound represented by the general formula (C-II) may be synthesized by the methods described in each specification of JP-A Nos. 2003-3109 and 2003-119415, the disclosures of which are incorporated by reference. Also, starting materials, dye intermediates and synthesis route are not limited by these methods.

The content of the oil-soluble dye used in the invention in an ink composition is preferably 0.05 to 50% by mass and more preferably 0.1 to 10% by mass based on the ink composition.

(Color Microparticle Dispersion)

The aforementioned color microparticle dispersion used in the invention is itself an oil-soluble dye or comprises a color microparticle containing an oil-soluble dye and an oil-soluble polymer and dispersed in an aqueous medium, wherein the color microparticle dispersion may contain a hydrophobic high-boiling point organic solvent having boiling point of 150° C. or more and other colorants for obtaining a color other than a magenta color or for controlling the hue.

To state in more detail, the color microparticle dispersion is itself an oil-soluble dye or one in which an oil-soluble dye, an oil-soluble polymer and if necessary, a hydrophilic high-boiling point organic solvent and other colorants are dispersed as microparticle oil droplets in an aqueous medium, namely, are put in a so-called emulsion dispersion state.

The "aqueous medium" in the invention means those obtained by adding additives, if necessary, to water or water and a small amount of a water-miscible organic solvent.

<Oil-Soluble Polymer>

Detailed explanations will be furnished as to the oil-soluble polymer. No particular limitation is imposed on the oil-soluble polymer and a conventionally known one may be optionally selected according to the object. Examples of the oil-soluble polymer may include a vinyl polymer, condensed type polymer (polyurethane, polyester, polyamide, polyurea and polycarbonate).

Although the oil-soluble polymer may be any of water-insoluble types, water-dispersion (self-emulsified) types and water-soluble types, water-soluble types are preferable from the viewpoint of ease of the production of the color microparticle and dispersion stability.

The aforementioned water-dispersion type polymer may be any of ion dissociation types, nonionic dispersible group-containing types and mixtures of these types.

Examples of the ion dissociation type polymer include polymers having a cationic dissociation group such as a tertiary amino group and polymers having an anionic dissociation group such as carboxylic acid and sulfonic acid.

Examples of the nonionic dispersible group-containing polymer include polymers having a nonionic dispersible group such as a polyethyleneoxy group.

Among these polymers, ion dissociation type polymers containing an anionic dissociable group, nonionic dispersible group-containing type polymers and mixtures of these polymers are preferable in view of the dispersion stability of the color microparticle.

Preferable examples of the vinyl polymer and a monomer constituting the vinyl polymer are described in JP-A Nos. 2001-181547 and 2001-181549, the disclosures of which are incorporated by reference. Other examples of the monomer include cyano group-containing vinyl monomers (e.g., acrylonitrile and methacrylonitrile) and monomers having a carboxyl group and connecting indirectly to a polymer principal chain when forming a polymer (e.g., carboxyethylacrylate, 4-vinylbenzoic acid, 2-(2-acryloyloxyethyloxycarbonyl)propanic acid).

Also, polymers are preferable in which a dissociable group is introduced into the terminal of a high-molecular chain by radical polymerization of a vinyl monomer by using a chain transfer agent or an initiator having a dissociable group (or a substituent capable of deriving to a dissociable group) or an iniferter or by ion polymerization using a compound having a dissociable group (or a substituent capable of deriving to a dissociable group) in either of an initiator or a stopper.

Preferable examples of the aforementioned condensed type polymer and the monomer constituting the aforementioned condensed type polymer are described in JP-A No. 2001-226613.

As the foregoing oil-soluble polymer, every one of necessary structural raw materials may be used or two or more types of each structural raw material may be used in an optional proportion corresponding to various objects (e.g., adjustment of the glass transition temperature (Tg) or solubility of the polymer, the affinity of the polymer to the colorant, the compatibility of the polymer with the colorant and the stability of a dispersion).

Among these oil-soluble polymers, those having the above dissociable group are preferable, those having at least one of a carboxyl group and a sulfonic acid group as the dissociable group are more preferable and those having a carboxyl group as the dissociable group are particularly preferable.

The dissociable group may be introduced by acting a compound, such as an acid anhydride (e.g., maleic acid anhydride) which can introduce a dissociable group by a reaction, with a reactive group such as a hydroxy group or amino group, after the polymerization of aforementioned each polymer.

The content of the dissociable group is preferably 0.1 to 3.0 mmol/g and more preferably 0.2 to 2.0 mmol/g. When the content of the dissociable group is smaller, the self-emulsifiability of the polymer is smaller whereas when the content is larger, water-solubility is increased and there is therefore a tendency to impair the dispersion of the colorant.

Among the dissociable groups, the anionic dissociable group may also be an alkali metal (e.g., Na or K) or a salt of an ammonium ion and the cationic dissociable group may also be a salt of an organic acid (e.g., acetic acid, propionic acid or methanesulfonic acid) or of an inorganic acid (e.g., hydrochloric acid or sulfuric acid).

The molecular weight (Mw) of the oil-soluble polymer is usually 1000 to 200000 and preferably 2000 to 50000. When the molecular weight is less than 1000, there is a tendency that it is difficult to obtain a stable color microparticle dispersion whereas when the molecular weight is larger than 200000, there is a tendency that the solubility in an organic solvent is impaired and the viscosity of an organic solvent solution is increased, making it difficult to disperse.

The oil-soluble polymer is particularly preferably a vinyl polymer, polyurethane or polyester taking ease of introducing the dissociable group into account from the viewpoint of imparting affinity to the colorant, compatibility with the colorant and excellent dispersion stability.

Specific examples of the vinyl polymer include P-1) to P-105) described in JP-A No. 2001-181549. Other than the above, PA-1) to PA-11) will be listed below. The ratio in the parenthesis means a mass ratio. Specific examples of the aforementioned condensed type polymer include P-1) to P-38) described in JP-A No. 2001-226613, the disclosures of which are incorporated by reference herein.

The invention is, however, not limited to these specific examples.

PA-1) 2-Carboxyethylacrylate/n-butylmethacrylate copolymer (10:90). PA-2) 2-Carboxyethylacrylate/diphenylacrylamide/isobutylmethacrylate copolymer (15:10:75).

PA-3) 2-Carboxyethylacrylate/n-butylmethacrylate/diphenyl-2-methacryloyloxyethyl phosphate copolymer (10:60:30).

PA-4) N-(3-carboxypropyl)acrylamide/tert-butylmethacrylamide/butylacrylate copolymer (12:18:70).

PA-5) Poly n-butylmethacrylate using mercaptoacetic acid as a chain transfer agent (3.4:96.6).

PA-6) Isobutylmethacrylate/butylacrylate copolymer using 2-mercaptosuccinic acid as a chain transfer agent (4:40:56).

PA-7) Acrylonitrile/methacrylonitrile/isopropylmethacrylate/2-carboxyethylacrylate copolymer (40:40:15:5).

PA-8) Butylacrylate/n-butylmethacrylate copolymer (20:80).

PA-9) N-t-butylacrylamide/n-butylmethacrylate copolymer (50:50).

PA-10) N-t-butylacrylamide/n-butylacrylate/acrylic acid copolymer (30:67:3).

PA-11) Succinic acid mono(acryloyloxyethyl)/n-butylmethacrylate copolymer (15:85).

Production of the Color Microparticle Dispersion

The color microparticle dispersion according to the invention is produced by dispersing only the oil-soluble dye or the oil-soluble dye and the oil-soluble polymer in an aqueous medium (a solution containing at least water) in the form of a color microparticle. Specific examples of the latter method include a method in which a latex of the oil-soluble polymer is prepared in advance and then impregnated with the oil-soluble dye and a co-emulsification dispersing method.

Among these methods, a co-emulsification dispersing method is preferable. Preferable examples of the co-emulsification dispersing method include a method in which an organic solvent is emulsified and micronized by any one of a method in which water is added to the organic solvent containing the oil-soluble polymer and the oil-soluble dye and a method in which the organic solvent is added to water.

The aforementioned latex means one in which the foregoing oil-soluble polymer which is insoluble in an aqueous medium is dispersed in the form of fine particles in an aqueous medium. The dispersed state may be any of the following states: that the oil-soluble polymer is emulsified; that emulsion-polymerized or dispersed as micelles in the aqueous medium; or that the molecular chain of the oil-soluble polymer which partially has a hydrophilic structure in its molecule is itself dispersed molecular-wise.

First, a method in which the polymer latex is produced in advance and then impregnated with the oil-soluble dye will be explained.

A first example of this method comprises a first step of preparing a polymer latex, a second step of preparing an oil-soluble dye containing solution obtained by dispersing or dissolving the oil-soluble dye in an organic solvent and a third step of mixing the oil-soluble dye-containing solution with the polymer latex to prepare a color microparticle dispersion.

A second example of this method comprises a first step of preparing a polymer latex, a second step of preparing an oil-soluble dye containing solution obtained by dispersing or dissolving the oil-soluble dye in an organic solvent and mixing this oil-soluble dye-containing solution with a solution containing at least water to prepare a colorant microparticle dispersion solution and a third step of mixing the polymer latex with the colorant microparticle dispersion solution to prepare a color microparticle dispersion.

A third example of this method include the method described in JP-A No. 55-139471, the disclosures of which is incorporated by reference Next, the aforementioned co-emulsification dispersing method will be explained.

A first example of this method comprises a fist step of preparing a polymer-colorant mixed solution in which the oil-soluble dye and the oil-soluble polymer are dispersed or dissolved in an organic solvent and a second step of mixing the polymer-colorant mixed solution with a solution containing at least water to prepare a color microparticle dispersion.

A second example of this method comprises a fist step of preparing an oil-soluble dye-containing solution in which the oil-soluble dye is dispersed or dissolved in an organic solvent, a second step of preparing a polymer solution obtained by dispersing or dissolving an oil-soluble polymer in an organic solvent and a third step of mixing the oil-soluble dye-containing solution, the polymer solution and a solution containing at least water to prepare a color microparticle dispersion.

A third example of this method comprises a first step of preparing an oil-soluble dye-containing solution obtained by dispersing or dissolving the oil-soluble dye in an organic solvent and mixing this oil-soluble dye-containing solution with a solution containing at least water to prepare an oil-soluble dye microparticle dispersion solution, a second step of preparing a polymer solution obtained by dispersing or dissolving the oil-soluble polymer in an organic solvent and mixing this polymer solution with a solution containing at least water to prepare a polymer microparticle dispersion solution and a third step of mixing the oil-soluble dye microparticle dispersion solution with the polymer microparticle dispersion solution to prepare a color microparticle dispersion.

A fourth example of this method comprises a first step of preparing an oil-soluble dye-containing solution obtained by dispersing or dissolving the oil-soluble dye in an organic solvent and mixing this oil-soluble dye-containing solution with a solution containing at least water to prepare an oil-soluble dye microparticle dispersion solution, a second step of preparing a polymer solution obtained by dispersing or dissolving the oil-soluble polymer in an organic solvent and a third step of mixing the oil-soluble dye microparticle dispersion solution with the polymer solution to prepare a color microparticle dispersion.

A fifth example of this method comprises a step of mixing a solution containing at least water with the oil-soluble dye and the oil-soluble polymer to prepare a color microparticle dispersion directly.

In the color microparticle dispersion, the amount of the oil-soluble polymer to be used is preferably 10 to 1000 parts by mass and more preferably 50 to 600 parts by mass based on 100 parts by mass of the oil-soluble dye. If the proportion of the polymer to be used is less than 10 parts by mass, there is a tendency that fine and stable dispersion is difficult whereas if the amount exceeds 1000 parts by mass, the ratio of the oil-soluble dye in the color microparticle dispersion solution is small and there is therefore a tendency that there is no allowance for mix design when the color microparticle dispersion solution is used as a water-type ink.

The content of the color microparticle in the color microparticle dispersion is preferably 1 to 45% by mass and more preferably 2 to 30% by mass. The content can be optionally adjusted by dilution, vaporization, ultrafiltration or the like.

The average particle diameter of the color microparticles is preferably 1 to 500 nm, more preferably 3 to 300 nm and particularly preferably 3 to 200 nm. No particular limitation is imposed on the distribution of particle diameter and the color microparticles may have wide particle diameter distribution or mono-dispersed particle diameter distribution. The particle diameter and the distribution of particle diameter may also be controlled by centrifugation, filtration or the like.

Organic Solvent

There is no particular limitation to the organic solvent used in the production of the color microparticle dispersion and the organic solvent can be properly selected based on the solubility of the oil-soluble dye or oil-soluble polymer. Examples of the organic solvent include ketone type solvents such as acetone, methyl ethyl ketone and diethyl ketone, alcohol type solvents such as methanol, ethanol, 2-propanol, 1-propanol, 1-butanol and tert-butanol, chlorine type solvents such as chloroform and methylene chloride, aromatic solvents such as benzene and toluene, ester type solvents such as ethyl acetate, butyl acetate and isopropyl acetate, ether type solvents such as diethyl ether, tetrahydrofuran and dioxane and glycol ether type solvents such as ethylene glycol monomethyl ether and ethylene glycol dimethyl ether.

These organic solvents may be used either singly or in combinations of two or more. Also, these solvents may be in mixtures with water depending on the solubility of the oil-soluble dye or polymer.

Although no particular limitation is imposed on the amount of the organic solvent to be used as long as the amount is in the range within which the effect of the invention is not impaired, the amount of the organic solvent is preferably 10 to 2000 parts by mass and more preferably 100 to 1000 parts by mass based on 100 parts by mass of the oil-soluble polymer.

When the amount of the organic solvent to be used is less than 10 parts by mass, there is a tendency that fine and stable dispersion of the color microparticle is difficult whereas when the amount exceeds 2000 parts by mass, a step of removing and concentrating a solvent for removing the organic solvent may be necessary and there is a tendency that there is no allowance for mix design.

With respect to the organic solvent, it is preferable to remove it from the viewpoint of the stability of the color microparticle dispersion and safety and sanitation when the vapor pressure of the organic solvent is higher than that of water. As a method of removing the organic solvent, various known methods may be used corresponding to the type of solvent. Specifically, examples of these methods include a vaporizing method, vacuum vaporization method and ultrafiltration. This step of removing the organic solvent is preferably carried out as soon as possible immediately after the emulsification is finished.

(Hydrophilic Organic Solvent)

The hydrophilic organic solvent is used for the purpose of serving as a drying preventative agent and a permeability promoting agent. The hydrophilic organic solvent is preferably a hydrophilic organic solvent having a lower vapor pressure than water. Specific examples of the hydrophilic agent include polyhydric alcohols typified by ethylene glycol, propylene glycol, diethylene glycol, polyethylene glycol, thiodiglycol, dithiodiglycol, 2-methyl-1,3-propanediol, 1,2,6-hexanetriol, glycerol, trimethylolpropane and diethanolamine, substituted or unsubstituted aliphatic monohydric alcohols typified by amyl alcohol, furfuryl alcohol, diacetone alcohol, ethylene glycol monoethyl ether, diethylene glycol monoethyl ether and triethylene glycol monoethyl ether, hetero rings such as 2-pyrrolidone, N-methyl-2-pyrrolidone, 1,3-dimethyl-2-imidazolidinone and N-ethylmorpholine and sulfur-containing compounds such as sulfolane, dimethylsulfoxide and 3-sulfolene.

Among these solvents, polyhydric alcohols and substituted or unsubstituted aliphatic monohydric alcohols are preferable and polyhydric alcohols such as glycerol and diethylene glycol are more preferable. These hydrophilic organic solvents may be used either singly or in combinations of two or more.

These hydrophilic organic solvents are contained in an amount of preferably 5 to 60% by mass, more preferably 7 to 50% by mass and particularly preferably 10 to 40% by mass in ink.

(Surfactant)

Although a fluorine type surfactant is used as the surfactant in the invention, a perfluoroalkylenesulfonic acid and its derivatives are excluded for the reasons set forth below.

A fluorine type surfactant is a particularly promising compound to reduce the surface tension of an ink solution due to the nature (e.g., water repellency/oil repellency and lubricity) peculiar to a fluorine alkyl chain. Many fluorine type surfactants are generally perfluorooctanesulfonic acid or its derivatives and perfluorohexanic acid or its derivatives. Examples of these compounds are disclosed in, for example, each publication of JP-A Nos. 49-46733, 64-536 and 2-141739. However, there is concern as to the safety (cumulative characteristics) of these perfluoroalkylenesulfonic acids or their derivatives. It is considered that if the chain length of the perfluoroalkyl chain is shortened, decomposition characteristics (the decomposition characteristics of the compound after use) are improved, which is advantageous from the viewpoint of safety. However, in such a case the surfactant ability is decreased, for example, a decrease in dynamic surface tension. Therefore, the perfluoroalkylenesulfonic acid or its derivative is unsuitable as the surfactant used in the invention and is hence excluded.

As mentioned above, the surfactant used in the invention is a fluorine type surfactant other than the above. Among these surfactants, nonionic and anionic compounds are preferable and anionic compounds are particularly preferred.

Specific examples of the surfactant include a perfluoroalkanecarboxylic acid or its salt, ω-H-perfluoroalkanecarboxylic acid or its salt, 1,1,2,2-H-perfluoroalkane sulfate or its salt, ω,1,1,2,2-H-perfluoroalkane sulfate or its salt and compounds represented by the following general formula (1) or (2). A perfluoroalkanecarboxylic acid or its salt, 1,1,2,2-H-perfluoroalkane sulfate or its salt and compounds represented by the following general formula (1) or (2) are preferable. A perfluoroalkanecarboxylic acid or its salt, 1,1,2,2-H-perfluoroalkane sulfate or its salt and compounds represented by the following general formula (1) or (2) are more preferable. The salt of 1,1,2,2-H-perfluoroalkane sulfate and compounds represented by the following general formula (1) or (2) are most preferable.

$$R-(CF_2)_m-(CH_2)_n-Y^1-L^1-Z \qquad \text{General Formula (1)}$$

In the general formula (1), R represents a hydrogen atom or a fluorine atom and preferably a fluorine atom.

m denotes a number of 3 to 16, and is preferably 3 to 8, more preferably 3 to 6 and particularly preferably 3 or 4 from the viewpoint of safety, decomposition characteristics, or the like.

n denotes a number of 0 to 6, and is preferably 0 to 4 and particularly preferably 0 or 2.

$Y^1$ represents a connecting group. Examples of the connecting group include -(covalent bond)-, —O—, —S—, —CO—, —COO—, —CONR$^{10}$—, —OCO—, —OCONR$^{11}$—, —NR$^{12}$CO—, —NR$^{13}$COO—, —NR$^{14}$CONR$^{15}$—, —SO—, —SO$_2$—, —SO$_2$NR$^{16}$—, —NR$^{17}$SO$_2$—, —SiR$^{18}$R$^{19}$—, —PR$^{20}$—, —PO(OR$^{21}$)O—, —OPO(OR$^{22}$)—, —PO(OR$^{23}$)NR$^{24}$—, —NR$^{25}$PO (OR$^{26}$)—, —NR$^{27}$PO(NR$^{28}$R$^{29}$)NR$^{30}$— and —NR$^{31}$— (wherein R$^{10}$ to R$^{31}$ respectively represent a hydrogen atom or a substituted or unsubstituted alkyl group). -(covalent bond)-, —O—, —S—, —CO—, —COO—, —CONR$^{10}$—, —OCO—, —OCONR$^{11}$—, —SO—, —SO$_2$— and —SO$_2$NR$^{16}$- are preferable and -(covalent bond)-, —O—, —S—, —CO—, —COO—, —OCO—, —SO—, —SO$_2$— and —SO$_2$NR$^{16}$— are more preferable. -(covalent bond)-, —O—, —S—, —COO—, —OCO—, —SO$_2$— and —SO$_2$NR$^{16}$— are still more preferable. Particularly when m is small, the lower the hydrophilic ability of Y$^1$ is, the greater the decrease in the solubility of the whole molecule and, more importantly the surface tension-reducing ability is improved. Therefore, O, S, SO$_2$ and SO are particularly preferable.

$L^1$ represents a constitutional divalent group having 2 or more carbon atoms, and specifically represents a substituted or unsubstituted alkylene group, a substituted or unsubstituted cycloalkylene group, a substituted or unsubstituted bicycloalkylene group, a substituted or unsubstituted arylene group, a substituted or unsubstituted heteroarylene group or a divalent group in which a substituted or unsubstituted alkylene group, a substituted or unsubstituted cycloalkylene group, a substituted or unsubstituted arylene group and a substituted and unsubstituted heteroarylene group are bound by a connecting group, wherein the connecting group has the same meanings as $Y^1$.

$L^1$ is preferably a substituted or unsubstituted alkylene group, a substituted or unsubstituted cycloalkylene group, a substituted or unsubstituted arylene group or a divalent group in which a substituted or unsubstituted alkylene group and a substituted or unsubstituted arylene group are bound by a connecting group. $L^1$ is more preferably a substituted or unsubstituted alkylene group having 3 or more and 12 or less constitutional carbon atoms, a substituted or unsubstituted cycloalkylene group having 3 or more and 8 or less constitutional carbon atoms, a substituted or unsubstituted arylene group having 6 or more and 10 or less constitutional carbon atoms or a divalent group in which a substituted or unsubstituted alkylene group and a substituted or unsubstituted arylene group are bound by a connecting group and the total number of constitutional carbon atoms is 6 or more and 20 or less. $L^1$ is still more preferably a substituted or unsubstituted alkylene group having 3 or more and 12 or less constitutional carbon atoms, a substituted or unsubstituted arylene group having 6 or more and 10 or less constitutional carbon atoms or a divalent group in which a substituted or unsubstituted alkylene group and a substituted or unsubstituted arylene group are bound by a connecting group and the total number of constitutional carbon atoms is 6 or more and 20 or less. $L^1$ is particularly preferably an unsubstituted alkylene group having 3 or more and 12 or less constitutional carbon atoms and a divalent group in which an unsubstituted alkylene group and an unsubstituted arylene group are bound by a connecting group and the total number of constitutional carbon atoms is 6 or more and 20 or less.

$L^1$ has a preferable range differing depending on m. Generally, when m is small, the hydrophobic characteristics of $L^1$ is raised, whereby water-solubility is decreased and it tends to be oriented at on the surface, so that even if it is added in a low concentration, a sufficient effect is easily produced. When m is large, desired solubility and surface activity can be obtained by decreasing the number of carbon atoms constituting $L^1$ and by introducing a hydrophilic connecting group. Taking the case where $L^1$ is an unsubstituted alkylene group as an example, explanations will be furnished. When m is 3 or more and 6 or less, the number of carbons constituting the alkylene group is preferably 5 or more and 12 or less. When R is F and m is 7 or more and 16 or less, the number of carbons constituting the alkylene group is preferably 3 or more and 8 or less.

Z represents an anionic group or its salt. Specific examples of Z include —COOX, —SO$_3$X, —OSO$_3$X, —PO(OR$^{40}$)OX, —PO(OX)$_2$, —OPO(OR$^{41}$)OX and —OPO(OX)$_2$. Among these groups, —COOX, —SO$_3$X and —OSO$_3$X are preferable.

Here, X represents a hydrogen atom or a cation and the cation represents an ammonium ion or a metal cation. X is preferably an ammonium ion or a metal cation, more preferably an ammonium ion or a monovalent metal cation and particularly preferably an ammonium ion, a lithium ion, a sodium ion or a potassium ion.

$R^{40}$ and $R^{41}$ respectively represent a hydrogen atom or a substituted or unsubstituted alkyl group.

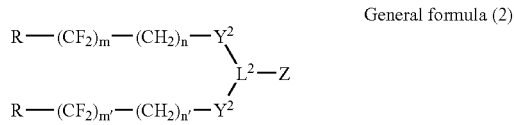

General formula (2)

R, m, n and Z have the same meanings as those defined in the general formula (1), m' and n' have the same meanings as m and n respectively and $Y^2$ has the same meanings as $Y^1$ in the general formula (1).

$L^2$ represents a trivalent group having 2 or more carbon atoms and specifically represents a substituted or unsubstituted alkanetriyl group, a substituted or unsubstituted cycloalkanetriyl group, a substituted or unsubstituted bicycloalkanetriyl group, a substituted or unsubstituted aryltriyl group or a substituted or unsubstituted heteroaryltriyl group. The connecting group has the same meanings as $Y^2$.

$L^2$ is preferably a substituted or unsubstituted alkanetriyl group, a substituted or unsubstituted cycloalkanetriyl group, a substituted or unsubstituted aryltriyl group or a trivalent group in which a substituted or unsubstituted alkylene group and a substituted or unsubstituted arylene group are bound using a connecting group.

$L^2$ is more preferably a substituted or unsubstituted alkanetriyl group having 2 or more and 12 or less structural carbon atoms, a substituted or unsubstituted cycloalkanetriyl group having 3 or more and 8 or less structural carbon atoms, a substituted or unsubstituted aryltriyl group having 6 or more and 10 or less structural carbon atoms or a trivalent group in which a substituted or unsubstituted alkylene group and a substituted or unsubstituted arylene group are bound using a connecting group and the total number of constitutional carbon atoms is 6 or more and 20 or less.

$L^2$ is still more preferably a substituted or unsubstituted alkanetriyl group having 2 or more and 12 or less structural carbon atoms, a substituted or unsubstituted aryltriyl group having 6 or more and 10 or less structural carbon atoms or a trivalent group in which a substituted or unsubstituted alkylene group and a substituted or unsubstituted arylene group are bound using a connecting group and the total number of constitutional carbon atoms is 6 or more and 20 or less.

$L^2$ is particularly preferably an unsubstituted alkanetriyl group having 2 or more and 12 or less structural carbon atoms or a trivalent group in which an unsubstituted alkylene group and an unsubstituted arylene group are bound using a connecting group and the total number of constitutional carbon atoms is 6 or more and 20 or less.

Specific examples of the surfactant used in the invention will be shown in the following.

A-1 $C_6F_{13}$—O—SO$_3$X

A-2 $C_8F_{17}$—$C_2H_4$—OSO$_3$X

A-3 $C_4F_9$O—$(CH_2)_4$—SO$_3$X

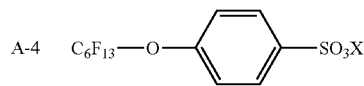

A-4 $C_6F_{13}$—O—⟨benzene ring⟩—SO$_3$X

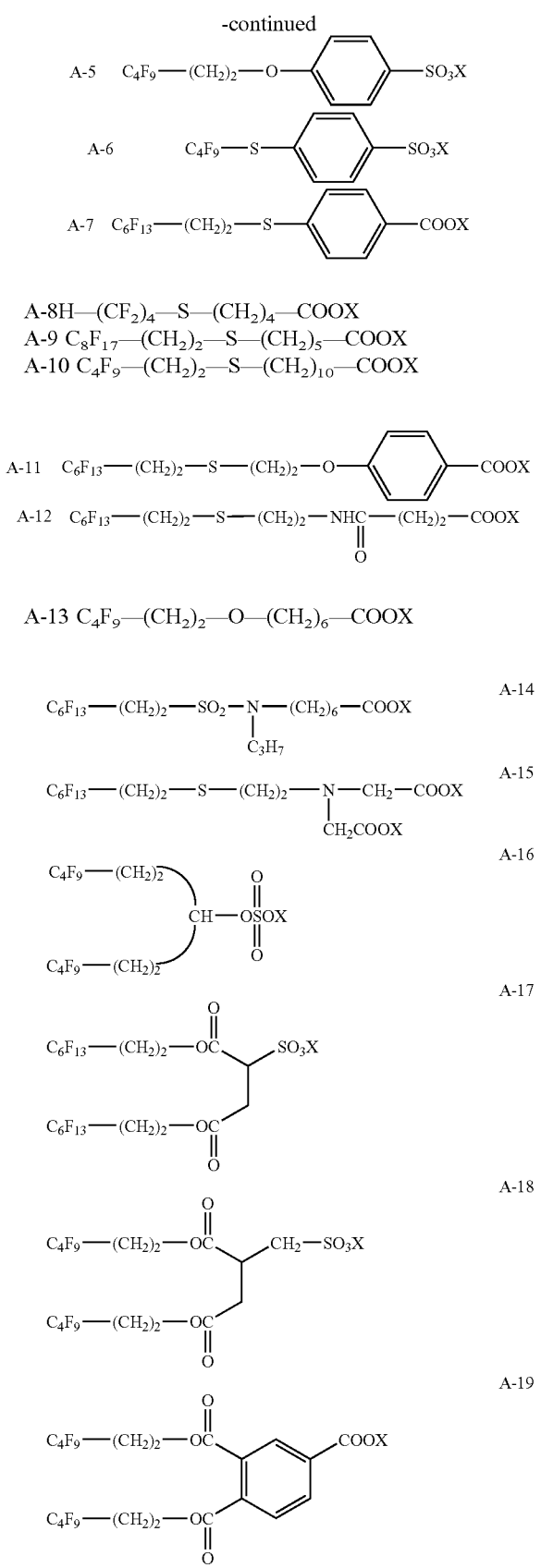

wherein X represents the same group as above.

In the invention, the amount of the surfactant is preferably 0.2 to 4% by mass, more preferably 0.3 to 3.5% by mass and particularly preferably 0.4 to 3% by mass in the ink composition.

The ink composition of the invention may use a surfactant other than the above surfactants together.

Example of such a surfactant include nonionic, cationic or anionic surfactants. Examples of the anionic surfactant include fatty acid salts, alkyl sulfates, alkylaryl sulfonates (e.g., alkylbenzene sulfonates and petroleum sulfonates), dialkylsulfosuccinates, alkyl phosphates, naphthalenesulfonic acid formalin condensate and polyoxyethylenealkyl sulfates. Examples of the nonionic surfactant include acetylene type diols (e.g., 2,4,7,9-tetramethyl-5-decyne-4,7-diol), polyoxyethylene alkyl ether (e.g., polyoxyethylene decyl ether and ethyleneoxide adducts of acetylene type diols), polyoxyethylene fatty acid esters, sorbitan fatty acid esters, polyoxyethylenesorbitan fatty acid esters, polyoxyethylenealkylamine, glycerol fatty acid ester and oxyethyleneoxypropylene block copolymers.

Amine oxide type amphoteric surfactants such as N,N-dimethyl-N-alkylamine oxides are also preferable. Further, those exemplified as a surfactant and described in JP-A No. 59-157,636, pp. 37–38 and Research Disclosure No. 308119 (1989) may also be used.

Because of a resistance to precipitation and separation from ink and decreased foaming tendency, anionic surfactants in which the hydrophobic part has two chains or is branched, anionic surfactants having a hydrophilic group in the vicinity of the center of the hydrophobic part, nonionic surfactants (e.g., one-terminal esters of a polyethylene oxide of 2-butyloctanic acid and polyethylene oxide adducts of undecane-6-ol) in which the hydrophobic part has two chains or is branched and nonionic surfactants (e.g., ethylene oxide adducts of acetylene type diols (SURFYNOL series (Air Products & Chemicals)) having a hydrophilic group in the vicinity of the center of the hydrophobic part are preferable. Among these surfactants, those having a molecular weight of 200 or more and 1000 or less are preferable, those having a molecular weight of 300 or more and 900 or less are more preferable and those having a molecular weight of 400 or more and 900 or less are particularly preferable.

The content of these surfactants is preferably 0 to 2% by mass and particularly preferably 0.1 to 1.5% by mass in the ink composition.

(Additives)

The ink composition of the invention may contain additives selected properly according to the object to the extent that the effect of the invention is not impaired.

Examples of these additives include neutralizing agents, hydrophobic high-boiling point organic solvents, dispersants and dispersion stabilizers.

The neutralizing agent is preferably used from the viewpoint of pH adjustment of the color microparticle dispersion, control of self-emulsifiability and provision of dispersion stability when the oil-soluble polymer has a non-neutralized dissociable group.

Examples of the neutralizing agent include organic bases and inorganic alkalis.

Examples of the organic base include triethanolamine, diethanolamine, N-methyldiethanolamine and dimethylethanolamine.

Examples of the inorganic alkali include hydroxides of alkali metals (e.g., sodium hydroxide, lithium hydroxide and potassium hydroxide), carbonates of alkali metals (e.g., sodium carbonate and sodium hydrogen carbonate) and ammonia.

The neutralizing agent is added such that the pH is preferably 4.5 to 10.0 and more preferably 6.0 to 10.0, with the view of improving the dispersion stability of the color microparticle dispersion.

The aforementioned hydrophobic high-boiling point organic solvent is used to regulate the viscosity, specific gravity and printing performance of the color microparticle dispersion. As the hydrophobic high-boiling point organic solvent, those which are hydrophobic and have a boiling point of preferably 150° C. or more and more preferably 170° C. or more. Here, the "hydrophobic" means that the solubility in 25° C. distilled water is 3% or less. Also, the dielectric constant of the hydrophobic high-boiling point organic solvent is preferably 3 to 12 and more preferably 4 to 10. Here, the dielectric constant means dielectric constant relative to that of vacuum at 25° C. As the hydrophobic high-boiling point organic solvent, compounds described in U.S. Pat. No. 2,322,027 and JP-A No. 2000-78531 may be used. Specific examples of the hydrophobic high-boiling point organic solvent include triphosphates, diphthalates, alkylnaphthalenes and benzoates. These compounds put in any of a liquid and a solid state at ambient temperature may be used in accordance with the object of the present invention.

The amount of the high-boiling point solvent to be used is preferably 0 to 1000 parts by mass and more preferably 0 to 300 parts by mass based on 100 parts by mass though there is no particular limitation to the amount as long as the effect of the invention is not impaired.

The dispersant and/or the dispersion stabilizer may be added to any of the aforementioned polymer latex, oil-soluble dye-containing solution, polymer oil-soluble dye mixed solution, colorant microparticle dispersion solution, polymer solution and solution containing at least water. It is however preferable to add these agents to the oil-soluble dye-containing solution or the solution containing water in the step before the polymer latex and/or the colorant microparticle dispersion solution are prepared.

Examples of the dispersant or dispersion stabilizer include various surfactants such as cationic, anionic or nonionic ones, water-soluble or water-dispersible low-molecular compounds and oligomers. The amount of the dispersant or dispersion stabilizer to be added is 0 to 100% by mass and preferably 0 to 20% by mass based on the total amount of the oil-soluble dye and oil-soluble polymer.

Ink Composition, Ink Jet Ink and Ink Jet Recording Method

The ink composition and ink jet ink according to the invention comprises the color microparticle dispersion, a hydrophilic organic solvent and the surfactant represented by the general formula (1) and may further comprise other additives appropriately selected, if necessary. The oil-soluble dye contained in the ink composition functions as a dye and a colorant for materials to be recorded. The ink composition is preferably used for an ink jet.

The ink jet recording ink according to the invention can be applied to any ink jet recording system and may be preferably used in, for example, a charge control system jetting ink by utilizing electrostatic induction force, a drop-on-demand system (pressure pulse system) utilizing the oscillation pressure of a piezoelectric element, an acoustic ink jet system jetting ink by utilizing radiation pressure obtained by applying acoustic beams changed from electric signals to ink and a thermal ink jet (bubble jet (R)) system utilizing pressure produced by air bubbles formed by heating ink.

The above ink jet recording systems include a system in which a number of inks, called photo inks, having a low concentration are each jetted in small volume, a system improved in image quality by using plural inks which have substantially the same hue and different concentrations and a system using a colorless and transparent ink.

(Ther Additives)

As the additives, a viscosity regulator, antioxidant, mildewproof agent, rust preventive agent, pH regulator, antifoaming agent, chelating agent, ultraviolet ray absorber and the like may be properly selected and used in an appropriate amount. As these additives, known compounds described in, for example, JP-A No. 2001-181549, the disclosures of which is incorporated by reference herein.

The viscosity of the ink of the invention is preferably 30 mPa·s or less and is more preferably adjusted to 20 mPa·s or less. A viscosity regulator is sometimes used for the purpose of adjusting viscosity. Examples of the viscosity regulator include celluloses and water-soluble polymers such as polyvinyl alcohols.

Recording Material

Examples of the recording material used in an ink jet recording method using the ink of the invention include common paper, on-machine-coated paper and plastic films. When coated paper is used as a recording material, image quality is improved and is therefore preferable. There are descriptions concerning recording materials in, for example, JP-A No. 2001-181549, the disclosures of which are incorporated by reference.

EXAMPLES

The present invention will be explained in more detail by way of examples, which are not intended to be limiting of the invention, in which all designations of "parts" and "%" indicate "parts by mass" and "mass percentage (% by mass)", respectively, unless otherwise noted.

Production Example

Production Example 1

Preparation of a Color Microparticle Dispersion (B-1)

2 mol/L of sodium hydroxide is gradually added to a mixed solution consisting of 4 parts of tetrahydrofuran, 6 parts of tert-butanol, 1.5 parts of an oil-soluble polymer (PA-6) and 0.5 parts of the following oil-soluble dye (a-17) in such an amount that the acid of the oil-soluble polymer is neutralized and the mixture is then raised to 70° C. Then, 30 parts of water is gradually added to the mixture with stirring the mixture to emulsify with phase inversion. The resulting solution is concentrated at 30° C. under reduced pressure to prepare a color microparticle dispersion having a solid content of 16%. The particle diameter of a color microparticle in the color microparticle dispersion is 22 nm in terms of volume average diameter (measured by a Microtrack UPA150; manufactured by Nikkiso Co., Ltd.). The resulting dispersion is abbreviated as a color microparticle dispersion (B-1).

Production Example 2

Preparation of a Color Microparticle Dispersion (B-2)

A mixed solution consisting of 3 parts of ethyl acetate, 0.5 parts of cyclohexanone, 1.4 parts of an oil-soluble polymer (PA-1) and 0.6 parts of an oil-soluble dye (a-17) is prepared. In the meantime, a mixed solution containing 2 mol/L sodium hydroxide in an amount necessary to neutralize the acid of the oil-soluble polymer, 15 parts of water and 0.3 parts of sodium di(2-ehtylhexyl)sulfosuccinate is prepared. The above two mixed solutions are joined together and mixed to emulsify using a homogenizer. The mixture is then concentrated at 30° C. under reduced pressure to prepare a color microparticle dispersion having a solid content of 13.3%. The particle diameter of a color microparticle in the color microparticle dispersion is 82 nm in terms of volume average diameter. The resulting dispersion is abbreviated as a color microparticle dispersion (B-2).

Production Example 3

Preparation of a Color Microparticle Dispersion (B-3)

A mixed solution consisting of 3 parts of ethyl acetate, 0.5 parts of cyclohexanone, 0.8 parts of an oil-soluble polymer (PA-9) and 0.6 parts of an oil-soluble dye (a-17) and 0.4 parts of the following hydrophobic high-boiling point organic solvent is prepared. In the meantime, a mixed solution containing 2 mol/L sodium hydroxide in an amount necessary to neutralize the acid of the oil-soluble polymer, 15 parts of water and 0.3 parts of sodium di(2-ehtylhexyl) sulfosuccinate is prepared. The above two mixed solutions are joined together and mixed to emulsify using a homogenizer. The mixture is then concentrated at 30° C. under reduced pressure to prepare a color microparticle dispersion having a nonvolatile component content of 14.0%. The particle diameter of a color microparticle in the color microparticle dispersion is 77 nm in terms of volume average diameter. The resulting dispersion is abbreviated as a color microparticle dispersion (B-3).

Production Example 4

Preparation of a Color Microparticle Dispersion (B-4)

6.4 parts of the following oil-soluble dye (a-7), 7.0 parts of sodium dioctylsulfosuccinate and 7.8 parts of an oil-soluble polymer (PA-10) are dissolved at 70° C. in 5.0 parts of the following hydrophobic high-boiling point organic solvent (S-1) and 50 parts of ethyl acetate. To this solution is added 400 parts of deionized water with stirring the solution by using a magnetic stirrer to produce a oil-in-water type coarse particle dispersion. Next, this coarse particle dispersion is allowed to pass through a micro-fluidizer (MICROFLUIDEX INC) five times under a pressure of 600 bar to micronize the particle. Further, the resulting emulsion is concentrated to 160 parts by using a rotary evaporator. The particle diameter of a color microparticle in the color microparticle dispersion is 48 nm in terms of volume average diameter. The resulting dispersion is abbreviated as a color microparticle dispersion (B-4).

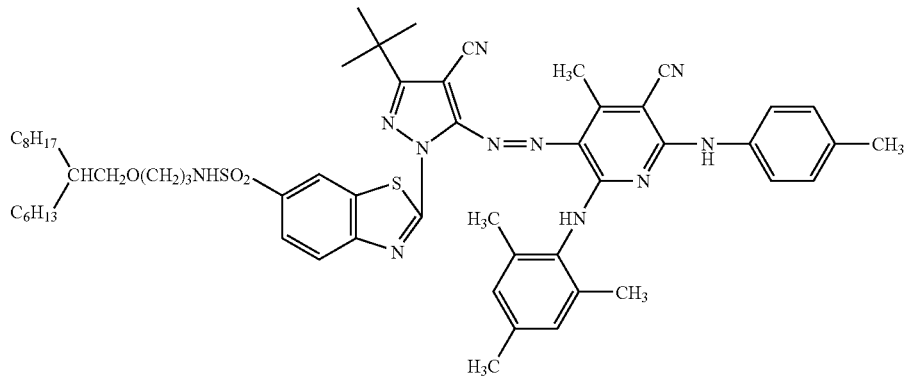

a-7

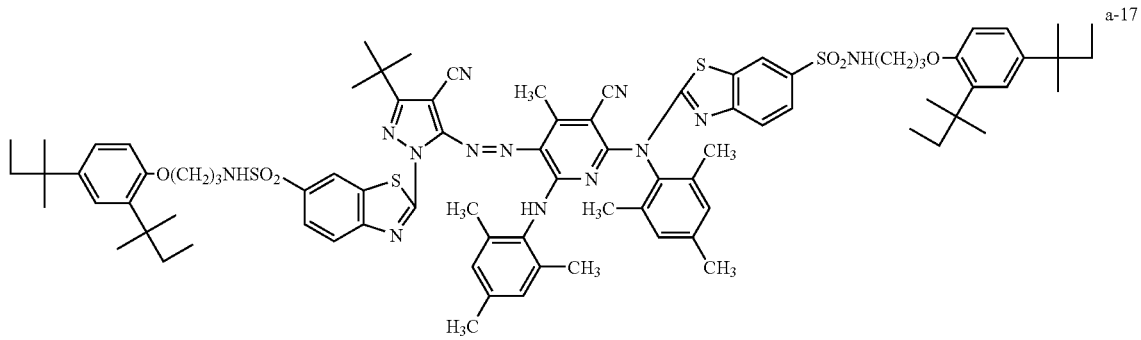

a-17

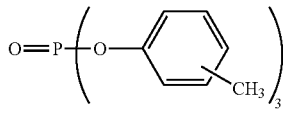

S-1

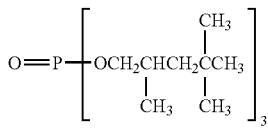

S-2

Production Examples 5 to 10

Production Examples 5 and 6 are produced using methods according to Production Examples 1 and 2 respectively and Production Examples 7 to 10 are produced using a method according to Production Example 3. The oil-soluble polymers and oil-soluble dyes to be used are shown in Table 1.

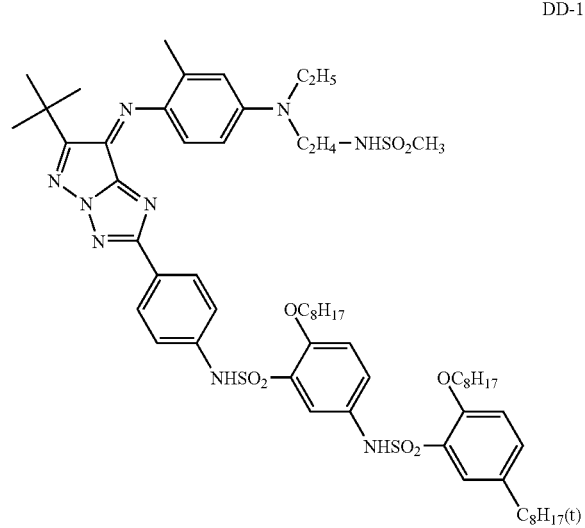

DD-1

DD-2

TABLE 1

| Production Example | Oil-soluble polymer | Colorant | Hydrophobic high boiling point organic solvent | Dispersion | Particle diameter (nm) |
|---|---|---|---|---|---|
| 1 | PA-6 | a-21 | — | Good | 22 |
| 2 | PA-1 | a-21 | — | Good | 82 |
| 3 | PA-9 | a-21 | S-1 | Good | 77 |
| 4 | PA-10 | a-7 | S-1 | Good | 35 |
| 5 | P-7[Note 1)] | a-21 | — | Good | 48 |
| 6 | P-15 | a-21 | — | Good | 78 |
| 7 | PA-3 | a-21 | S-1, S-2[Note 2)] | Good | 74 |
| 8 | PA-5 | a-21 | S-1, S-2[Note 2)] | Good | 70 |
| 9 | PA-7 | a-21 | S-1, S-2[Note 2)] | Good | 65 |
| 10 | PA-9 | DD-1 | S-1, S-2[Note 2)] | Good | 71 |

Note 1) Compound P-7) described in JP-A No. 2001-226613
Note 2) S-1 and S-2 are used in the following weight ratio: S-1:S-2 = 36:64

As is clear from the results shown in Table 1, a color microparticle dispersion which has good dispersibility, is free from flocculation and has a small particle diameter can be produced.

Example 1

(Production of an Ink 01)

The following materials are mixed, followed by filtration using a 0.45 μm filter to prepare an aqueous ink jet recording ink 01.

| | |
|---|---|
| Color microparticle dispersion (B-1) | 50 parts |
| Diethylene glycol | 8 parts |
| Tetraethylene glycol monobutyl ether | 2 parts |
| Glycerol | 5 parts |
| Diethanolamine | 1 part |
| Surfactant (A-9, X = Na) | 0.8 parts |
| Surfactant (B-1) | 1.0 part |
| Water | added to be a total of 100 parts |

Surfactant (B-1): One-terminal 2-butyloctanate of a polyethylene glycol (average ethylene oxide repeat number: 10)

Example 2

(Production of an Ink 02)

An aqueous ink jet recording ink $O_2$ is prepared in the same manner as in the production of the ink 01 except that the color microparticle dispersion (B-2) prepared in Production Example 2 is used in place of the color microparticle dispersion (B-1) in the production of the ink 01.

Example 3

(Production of an Ink 03)

The following materials are mixed, followed by filtration using a 0.45 μm filter to prepare an aqueous ink jet recording ink 03.

| | |
|---|---|
| Color microparticle dispersion (B-3) | 50 parts |
| Diethylene glycol | 8 parts |
| Tetraethylene glycol monobutyl ether | 2 parts |
| Glycerol | 5 parts |
| Diethanolamine | 1 part |
| Surfactant (A-5, X = Li) | 0.5 parts |
| Surfactant (A-18, X = Li) | 0.8 parts |
| Water | added to be a total of 100 parts |

Examples 4 to 8, Comparative Examples 1 and 2

(Production of Inks 04 to 10)

Aqueous ink jet recording inks 04 to 10 are prepared in the same manner as in the production of the ink 03 except that the color microparticle dispersion (B-3) is substituted for the color microparticle dispersions (B-3) to (B-10) prepared in Production Examples 3 to 10 as shown in Table 2 and the types and amounts of the surfactants are altered to those shown in Table 2 in the production of the ink 03.

Evaluation (Stability)

8 g of the ink is filled in a 10 mL closed container and stored at 75° C. for 4 days to evaluate according to the following standard.

Change in particle diameter=Particle diameter after heating/Particle diameter before heating A: There is no appearance of precipitation and coagulates and a change in particle diameter is less than 1.5.

B: There is no appearance of precipitation and coagulates and a change in particle diameter is 1.5 to 3.0.

C: Precipitation and coagulates are observed.

(Evaluation of Print Performance)

The produced inks 01 to 10 are respectively filled in the cartridge of an ink jet printer MC-2000 (manufactured by Seiko Epson Corporation). Using this printer, an image is recorded in PPC common paper and ink jet paper photo glossy paper EX (manufactured by Fuji Photo Film Co., Ltd.) to make the following evaluation. The results of evaluation are shown in Table 2.

The cartridge is set to the printer to confirm the spurt of the ink from all nozzles and then, an image is output to 10 sheets of A4 size paper to evaluate print disorders according to the following standard.

A: No print disorder is found from the start to end of printing.

B: Print disorders are sometimes found from the start to end of printing.

C: Print disorders are found from the start to end of printing.

TABLE 2

| Ink No. | Color microparticle dispersion | Surfactant (amount to be added) | Dynamic surface tension | Stability | Printing performance | Remarks |
|---|---|---|---|---|---|---|
| 1 | B-1 | A-9(0.8), B-1(1.0) | 29.4 | A | A | (Invention) |
| 2 | B-2 | A-9(0.8), B-1(1.0) | 28.9 | A | A | (Invention) |
| 3 | B-3 | A-5(0.5), A-18(0.8) | 31.3 | A | A | (Invention) |
| 4 | B-4 | A-10(1.2) | 30.3 | A | A | (Invention) |
| 5 | B-6 | A-16(0.8), B-1(0.5) | 28.8 | A | A | (Invention) |
| 6 | B-8 | A-17(0.8) | 28.9 | A | A | (Invention) |
| 7 | B-10 | A-10(1.2) | 30.2 | A | A | (Invention) |
| 8 | B-3 | A-10(1.2) | 30.5 | A | A | (Invention) |
| 9 | B-4 | B-2(1.0) | 32.9 | A | C | (Comparative Example) |
| 10 | B-4 | B-2(3.0) | 29.1 | C | B | (Comparative Example) |

In all surfactants except for the surfactant of the ink 03, X = Na.

Surfactant B-2: Olfin E1010

As is clear from the results of the above table, the ink 09 has high dynamic surface tension and exhibits poor printing performance. In the case of the ink 10, the dynamic surface tension thereof is lowered by increasing the amount of B-2, but the stability of the color microparticle dispersion in the ink is greatly impaired. In the case of the inks of the invention, on the contrary, desirable dynamic surface tension is obtained even if the amount of the color microparticle dispersion is small and these inks have excellent stability and printing performance.

What is claimed is:

1. An aqueous ink composition comprising:

a color microparticle dispersion comprising an oil-soluble dye;

a hydrophilic organic solvent; and a fluorine t surfactant represented by Formula (1) or Formula (2):

Formula (1)

wherein R represents a hydrogen atom or a fluorine atom; m denotes a number of 3 to 8; n denotes a number of 0 to 6; $Y^1$ represents a connecting group selected from the group consisting of —O—, —S—, —$SO_2$— and —SO—; $L^1$ represents a constitutional divalent group having 2 or more carbon atoms; and Z represents an anionic group or its salt, or

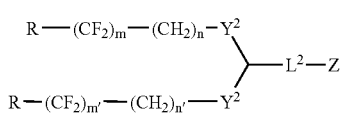
Formula (2)

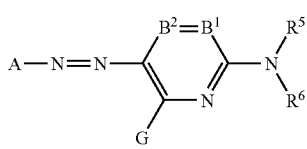
General formula (M-I)

wherein R represents a hydrogen atom or a fluorine atom; m denotes a number of 3 to 8; n denotes a number of 0 to 6; $Y^2$ represents a connecting group selected from the group consisting of —O—, —S—, —SO$_2$— and —SO—; $L^2$ represents a constitutional divalent group having 2 or more carbon atoms; and Z represents an anionic group or its salt.

2. An aqueous ink composition according to claim 1, wherein the oil-soluble dye includes at least one selected from the group consisting of compounds represented by the following general formulae (I), (II), (Y-I), (M-I) and (C-I):

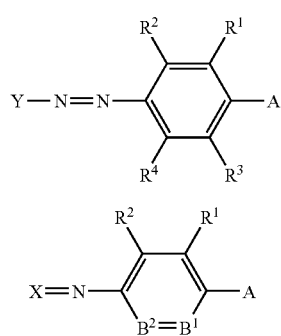

General formula (I)

General formula (II)

wherein $R^1$, $R^2$, $R^3$ and $R^4$ each independently represents a hydrogen atom, a halogen atom, an aliphatic group, an aromatic group, a heterocyclic group, a cyano group, a hydroxy group, a nitro group, an amino group, an alkylamino group, an alkoxy group, an aryloxy group, an amido group, an arylamino group, a ureide group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a sulfinyl group, a phosphoryl group, an acyl group, a carboxyl group or a sulfo group; A represents —NR$^5$R$^6$ or a hydroxy group; R$^5$ and R$^6$ each independently represents a hydrogen atom, an aliphatic group, an aromatic group or a heterocyclic group and may be bonded with each other to form an aromatic ring or a hetero ring; B$^1$ represents =C(R$^3$)— or =N—; B$^2$ represents —C(R$^4$)= or —N=, at least one of R$^1$ and R$^5$, R$^3$ and R$^6$, and R$^1$ and R$^2$ may be respectively bonded with each other to form an aromatic ring or hetero ring;

 General formula (Y-I)

wherein A and B each independently represents a heterocyclic group which may be substituted;

wherein A represents a substituent comprising a five-membered hetero ring; B$^1$ represents =CR$^1$— and B$^2$ represents —CR$^2$=, or one of B$^1$ and B$^2$ represents a nitrogen atom and the other of B$^1$ and B$^2$ represents =CR$^1$— or —CR$^2$=; R$^5$ and R$^6$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group where each group may further have a substituent; G, R$^1$ and R$^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted with an alkyl group, an aryl group or a heterocyclic group, an acylamino group, a ureide group, a sulfamoylamino group, an alkoxycarbonylamino group, an aryloxycarbonylamino group, an alkylarylsulfonylamino group, an arylsulfonylamino group, an aryloxycarbonylamino group, a nitro group, an alkylthio group, an arylthio group, an alkylsulfonyl group, an arylsulfonyl group, an alkylsulfinyl group, an arylsulfinyl group, a sulfamoyl group, a sulfo group or a heterocyclic thio group where each group may be further substituted; and R$^1$ and R$^5$ or R$^5$ and R$^6$ may be bonded to form a five- or six-membered ring;

General formula (C-I)

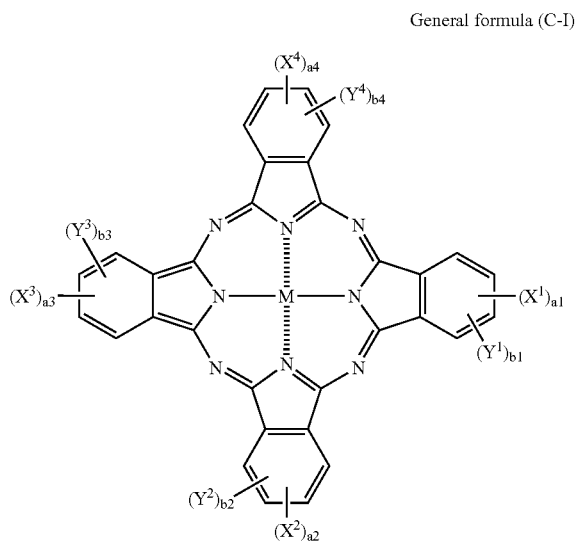

wherein X$^1$, X$^2$, X$^3$ and X$^4$ each independently represents —SO-Z$^1$, —SO$_2$-Z$^1$ or —SO$_2$NR$^{21}$R$^{22}$; Z$^1$ represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group; $R^{21}$ and $R^{22}$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group; $R^2$ and $R^{22}$ are not both hydrogen atoms at the same time; $Y^1$, $Y^2$, $Y^3$ and $Y^4$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureide group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, a carboxyl group or a sulfo group where each group may further have a substituent; $a^1$ and $b^1$ each independently denotes an integer from 0 to 4 and satisfy the relationship: $a^1+b^1=4$, $a^2$ and $b^2$ each independently denotes an integer from 0 to 4 and satisfy the relationship: $a^2+b^2=4$, $a^3$ and $b^3$ each independently denotes an integer from 0 to 4 and satisfy the relationship: $a^3+b^3=4$; $a^4$ and $b^4$ each independently denotes an integer from 0 to 4 and satisfy the relationship: $a^4+b^4=4$; the sum of $a^1$ to $a^4$ is 2 or more; and when any of $a^1$ to $a^4$ and $b^1$ to $b^4$ denote an integer of 2 or more; corresponding pluralities of any of $X^1$ to $X^4$ and $Y^1$ to $Y^4$ may each independently be the same or different and M represents a hydrogen atom; a metal element, an oxide, hydroxide or halide of a metal element.

3. An aqueous ink composition according to claim 1, wherein the vapor pressure of the hydrophilic organic solvent is lower than that of water.

4. An aqueous ink composition according to claim 1, wherein the fluorine type surfactant is an anionic compound.

5. An aqueous ink composition according to claim 1, wherein the fluorine type surfactant is contained in the aqueous ink composition in an amount of 0.2 to 4% by mass.

6. An aqueous ink composition according to claim 1, the composition further comprising at least one compound selected from the group consisting of a neutralizing agent, a hydrophobic high-boiling point organic solvent, a dispersant and a dispersion stabilizer.

7. An aqueous ink composition according to claim 1, wherein the color microparticle dispersion further contains an oil-soluble polymer.

8. An aqueous ink composition according to claim 7, wherein the amount of the hydrophilic organic solvent to be used is 10 to 2000 parts by mass based on 100 parts by mass of the oil-soluble polymer.

9. An aqueous ink composition according to claim 8, wherein an amount of the oil-soluble polymer to be used is 10 to 1000 parts by mass based on 100 parts by mass of the oil-soluble dye.

10. An aqueous ink composition according to claim 1, wherein the oil-soluble dye is the following compound:

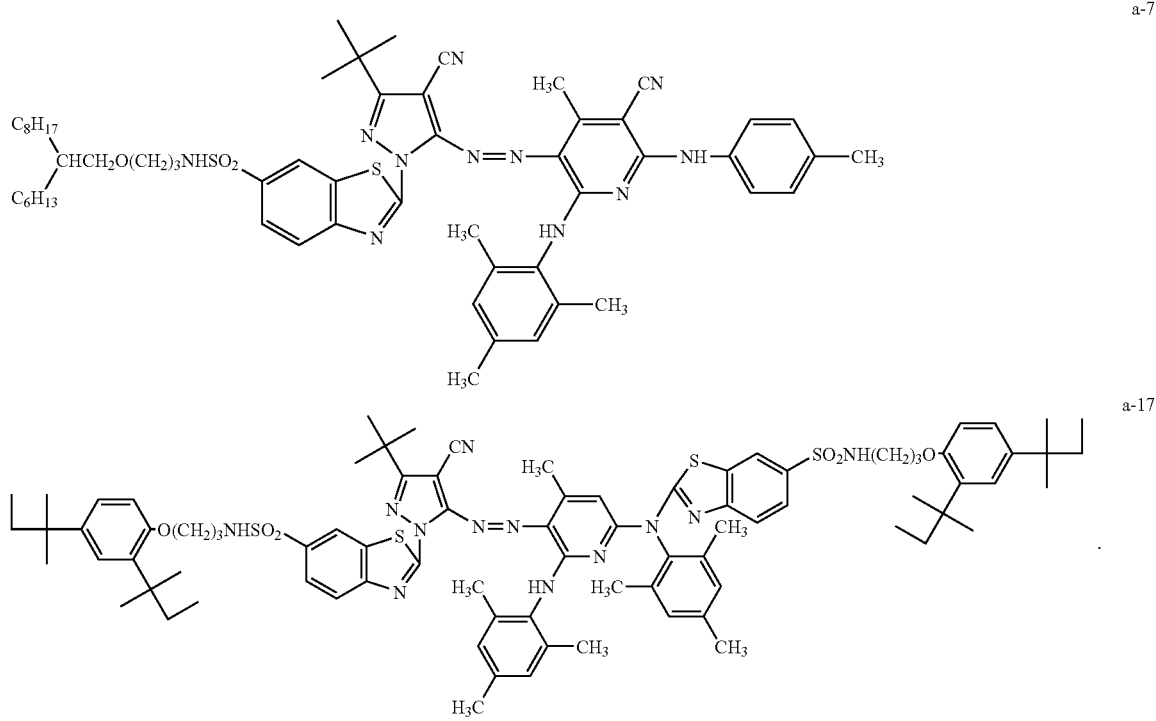

11. An ink jet recording method for recording an image comprising:

supplying an aqueous ink jet recording ink to an ink recording system, and jetting the ink from the ink jet recording system and applying the ink to a surface for receiving the image, wherein the aqueous ink composition comprises a color microparticle dispersion comprising an oil-soluble dye, a hydrophilic organic solvent and a fluorine surfactant represented by Formula (1) or Formula (2):

$$R—(CF_2)_m—(CH_2)_n—Y^1-L^1-Z \qquad \text{Formula (1)}$$

wherein R represents a hydrogen atom or a fluorine atom; m denotes a number of 3 to 8; n denotes a number of 0 to 6; $Y^1$ represents a connecting group selected from the group consisting of —O—, —S—, —SO$_2$— and —SO—; $L^1$ represents a constitutional divalent group having 2 or more carbon atoms; and Z represents an anionic group or its salt, or

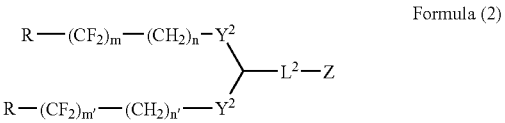

Formula (2)

wherein R represents a hydrogen atom or a fluorine atom; m denotes a number of 3 to 8; n denotes a number of 0 to 6; $Y^2$ represents a connecting group selected from the group consisting of —O—, —S—, —SO$_2$— and —SO—; $L^2$ represents a constitutional divalent group having 2 or more carbon atoms; and Z represents an anionic group or its salt.

12. An ink jet recording method according to claim 11, wherein the oil-soluble dye includes at least one selected from the group consisting of compounds represented by the general formulae (I), (II), (Y-I), (M-I) and (C-I):

General formula (I)

General formula (II)

wherein $R^1$, $R^2$, $R^3$ and $R^4$ each independently represents a hydrogen atom, a halogen atom, an aliphatic group, an aromatic group, a heterocyclic group, a cyano group, a hydroxy group, a nitro group, an amino group, an alkylamino group, an alkoxy group, an aryloxy group, an amido group, an arylamino group, a ureide group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a sulfinyl group, a phosphoryl group, an acyl group, a carboxyl group or a sulfo group; A represents —NR$^5$R$^6$ or a hydroxy group, R$^5$ and R$^6$ each independently represents a hydrogen atom, an aliphatic group, an aromatic group or a heterocyclic group and may be bonded with each other to form an aromatic ring or a hetero ring; $B^1$ represents =C(R$^3$)— or =N—; $B^2$ represents —C(R$^4$)= or —N=; and at least one of R$^1$ and R$^5$, R$^3$ and R$^6$, and R$^1$ and R$^2$ may be respectively bonded with each other to form an aromatic ring or hetero ring;

A-N=N-B   General formula (Y-I)

wherein A and B each independently represents a heterocyclic group which may be substituted;

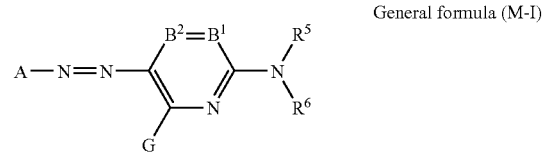

General formula (M-I)

wherein A represents a substituent comprising a five-membered hetero ring; $B^1$ represents =CR$^1$—and $B^2$ represents —CR$^2$=, or one of $B^1$ and $B^2$ represents a nitrogen atom and the other of $B^1$ and $B^2$ represents =CR$^1$— or —CR$^2$=; R$^1$ and R$^6$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group where each group may further have a substituent; G, R$^1$ and R$^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted with an alkyl group, an aryl group or a heterocyclic group, an acylamino group, a ureide group, a sulfamoylamino group, an alkoxycarbonylamino group, an aryloxycarbonylamino group, an alkylarylsulfonylamino group, an arylsulfonylamino group, an aryloxycarbonylamino group, a nitro group, an alkylthio group, an arylthio group, an alkylsulfonyl group, an arylsulfonyl group, an alkylsulfinyl group, an arylsulfinyl group, a sulfamoyl group, a sulfo group or a heterocyclic thio group where each group may be further substituted; and R$^1$ and R$^5$ or R$^5$ and R$^6$ may be bonded to form a five- or six-membered ring;

General formula (C-I)

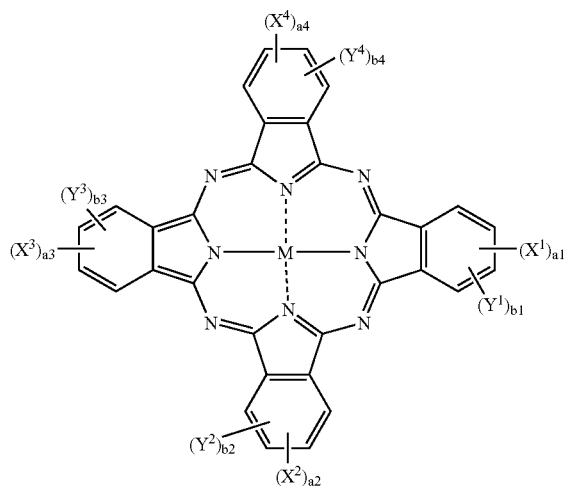

wherein $X^1$, $X^2$, $X^3$ and $X^4$ each independently represents —SO-$Z^1$, —SO$_2$-$Z^1$ or —SO$_2$NR$^{21}$R$^{22}$; $Z^1$ represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group; R$^{21}$ and R$^{22}$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group; R$^{21}$ and R$^{22}$ are not both hydrogen atoms at the same time; $Y^1$, $Y^2$, $Y^3$ and $Y^4$ each independently represents a hydrogen atom, a halogen atom, an alkyl group, a cycloalkyl group, an alkenyl group, an aralkyl group, an aryl group, a heterocyclic group, a cyano group, a hydroxy group, a nitro group, an amino group, an alkylamino group, an alkoxy group, an aryloxy group, an amido group, an arylamino group, a ureide group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, a carboxyl group or a sulfo group where each group may further have a substituent; $a^1$ and $b^1$ each independently denotes an integer from 0 to 4 and satisfy the relationship: $a^1+b^1=4$; $a^2$ and $b^2$ each independently denotes an integer from 0 to 4 and satisfy the relationship: $a^2+b^2=4$, $a^3$ and $b^3$ each independently denotes an integer from 0 to 4 and satisfy the relationship: $a^3+b^3=4$; $a^4$ and $b^4$ each independently denotes an integer from 0 to 4 and satisfy the relationship: $a^4+b^4=4$; the sum of $a^1$ to $a^4$ is 2 or more; and when any of $a^1$ to $a^4$ and $b^1$ to $b^4$ denote an integer of 2 or more, corresponding pluralities of any of $X^1$ to $X^4$ and $Y^1$ to $Y^4$ may each independently be the same or different; and M represents a hydrogen atom, a metal element or an oxide, hydroxide, halide of a metal element.

13. An ink jet recording method according to claim 11, wherein a vapor pressure of the hydrophilic organic solvent is lower than that of water.

14. An ink jet recording method according to claim 11, wherein the fluorine type surfactant is an anionic compound.

15. An ink jet recording method according to claim 11, wherein the fluorine surfactant is contained in the aqueous ink composition in an amount of 0.2 to 4% by mass.

16. An ink jet recording method according to claim 11, wherein the aqueous ink composition further comprises at least one compound selected from the group consisting of a neutralizing agent, a hydrophobic high-boiling point organic solvent, a dispersant and a dispersion stabilizer.

17. An ink jet recording method according to claim 11, wherein the color microparticle dispersion further contains an oil-soluble polymer.

18. An ink jet recording method according to claim 17, wherein the amount of the hydrophilic organic solvent to be used is 10 to 2000 parts by mass based on 100 parts by mass of the oil-soluble polymer.

19. An ink jet recording method according to claim 17, wherein an amount of the oil-soluble polymer to be used is 10 to 1000 parts by mass based on 100 parts by mass of the oil-soluble dye.

20. An ink jet recording method according to claim 11, wherein the oil-soluble dye is the following compound:

a-7

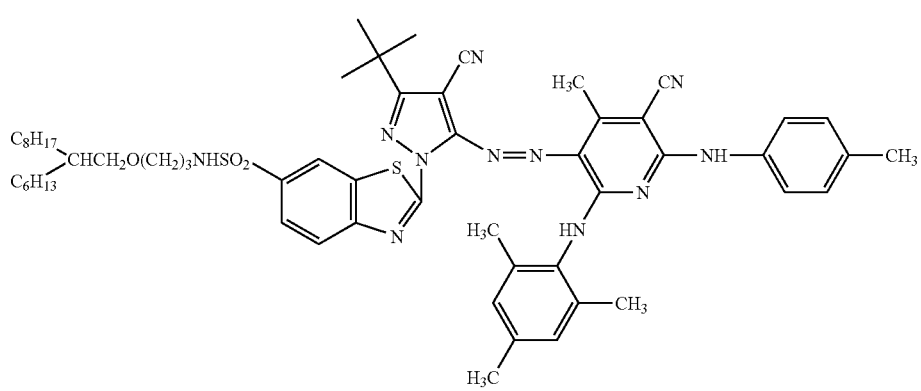

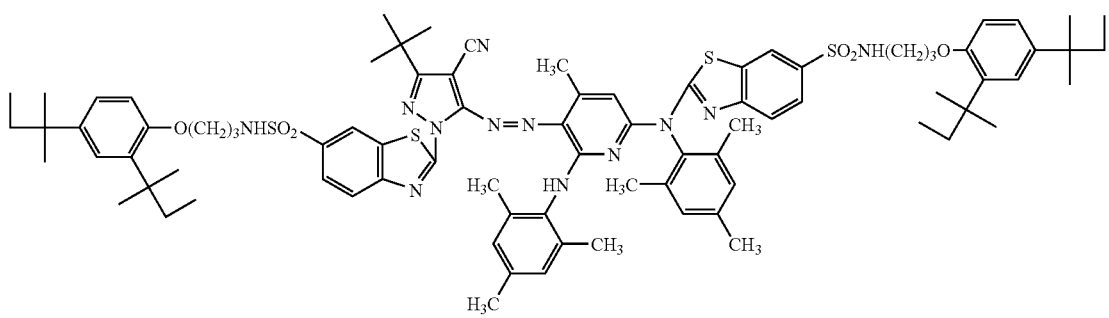
a-17
21. An aqueous ink composition comprising:
a color microparticle dispersion comprising an oil-soluble dye;
a hydrophilic organic solvent: and
a fluorine surfactant selected from the group consisting of the following compounds;
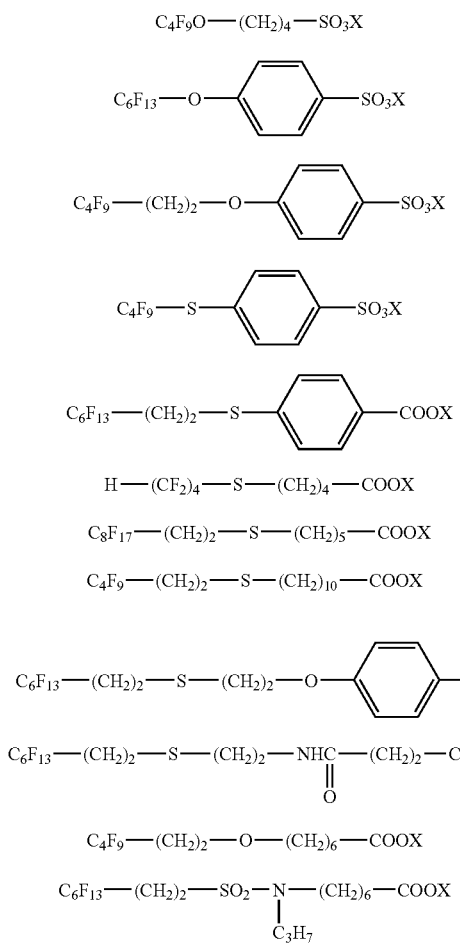
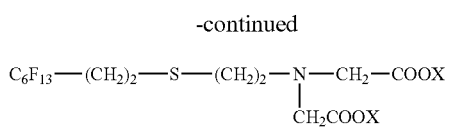
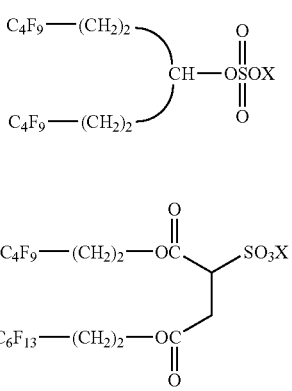
wherein X represents a hydrogen atom or a cation.
* * * * *